US010474397B2

(12) United States Patent
Lamberts et al.

(10) Patent No.: US 10,474,397 B2
(45) Date of Patent: Nov. 12, 2019

(54) UNIFIED INDIRECTION IN A MULTI-DEVICE HYBRID STORAGE UNIT

(71) Applicant: Western Digital Technologies, Inc., San Jose, CA (US)

(72) Inventors: Bernd Lamberts, Cupertino, CA (US); Vijay Karamcheti, Los Altos Hills, CA (US)

(73) Assignee: Western Digital Technologies, Inc, San Jose, CA (US)

( * ) Notice: Subject to any disclaimer, the term of this patent is extended or adjusted under 35 U.S.C. 154(b) by 0 days.

(21) Appl. No.: 15/621,932

(22) Filed: Jun. 13, 2017

(65) Prior Publication Data

US 2018/0356992 A1    Dec. 13, 2018

(51) Int. Cl.
*G06F 3/06* (2006.01)
(52) U.S. Cl.
CPC ............ *G06F 3/068* (2013.01); *G06F 3/0605* (2013.01); *G06F 3/0631* (2013.01); *G06F 3/0649* (2013.01); *G06F 3/0658* (2013.01); *G06F 3/0685* (2013.01)
(58) Field of Classification Search
CPC .... G06F 3/0611; G06F 3/0683; G06F 3/0685; G06F 3/068
See application file for complete search history.

(56) References Cited

U.S. PATENT DOCUMENTS

| | | | |
|---|---|---|---|
| 7,617,359 B2 | 11/2009 | Sutardja et al. | |
| 8,631,197 B2 | 1/2014 | Hall | |
| 8,947,816 B1 | 2/2015 | Ryan et al. | |
| 8,959,286 B2 | 2/2015 | Bell, Jr. et al. | |
| 9,009,393 B1 | 4/2015 | Sutardja | |
| 2009/0157940 A1 | 6/2009 | Sanvido | |
| 2010/0153631 A1* | 6/2010 | Moon | G06F 12/0246 711/103 |
| 2011/0252205 A1* | 10/2011 | Rege | G06F 12/0868 711/154 |

(Continued)

FOREIGN PATENT DOCUMENTS

EP    2535819 A1    12/2012

OTHER PUBLICATIONS

Kim et al. "HybridStore: A Cost-Efficient, High-Performance Storage System Combining SSDs and HDDs" dated Jul. 25-27, 2011, 1 page, 2011 IEEE 19th International Symposium on Singapore.

(Continued)

*Primary Examiner* — Hal Schnee
(74) *Attorney, Agent, or Firm* — Patent Law Works LLP

(57) ABSTRACT

The disclosed multi-device platform includes, by way of example, a system that receives a host command including a logical address and determines a hybrid storage device unit based on the logical address. The hybrid storage device unit has a set of hybrid physical storage devices and the set of hybrid physical storage devices includes one or more magnetic storage devices and one or more flash storage devices. The system selects a first plurality of physical storage devices from the set of hybrid physical storage devices, generates a plurality of device commands for the first plurality of physical storage devices based on the host command, and executes the plurality of device commands on the first plurality of physical storage devices.

20 Claims, 17 Drawing Sheets

(56) References Cited

U.S. PATENT DOCUMENTS

| | | | | |
|---|---|---|---|---|
| 2014/0351456 | A1* | 11/2014 | Sharifie | G06F 3/0613 710/5 |
| 2014/0351515 | A1* | 11/2014 | Chiu | G06F 3/0605 711/117 |
| 2014/0362515 | A1 | 12/2014 | Pronozuk et al. | |
| 2015/0032921 | A1* | 1/2015 | Malkin | G06F 3/0685 710/74 |
| 2015/0177995 | A1* | 6/2015 | Camp | G06F 11/10 711/103 |
| 2015/0178161 | A1 | 6/2015 | Burd et al. | |
| 2015/0234595 | A1 | 8/2015 | Satou | |
| 2015/0277802 | A1* | 10/2015 | Oikarinen | G06F 3/0631 711/114 |
| 2017/0262178 | A1* | 9/2017 | Hashimoto | G06F 3/0604 |
| 2017/0308319 | A1* | 10/2017 | Suzuki | G06F 12/00 |
| 2018/0018133 | A1* | 1/2018 | Balakrishnan | G06F 3/0611 |
| 2018/0210832 | A1* | 7/2018 | Tang | G06F 3/0679 |

OTHER PUBLICATIONS

Yang et al. "I-CASH: Intelligently Coupled Array of SSD and HDD" dated Jul. 25-27, 2011, 1 page, IEEE 17th International Symposium on San Antonio, TX.

PCT International Search Report and Written Opinion, Application No. PCT/US2018/020807, dated Jul. 16, 2018.

Cassuto, Y. et al., Indirection Systems for Shingled-Recording Disk Drives, IEEE Paper, 2010, p. 1-14, Hitachi Global Storage Technologies, Accessed Aug. 12, 2016.

SSD endurance, Technical White Paper, p. 1-4, HP, http://h20195.www2.hp.com/v2/getpdf.aspx/4AA5-7601ENW.pdf, Accessed Aug. 12, 2016.

Martindale, J., SSD vs. HDD Solid-state drives are speedier than hard disk drives. Are they worth it?, Website, updated Dec. 26, 2018, p. 1-17, http://www.digitaltrends.com/computing/solid-state-drives-vs-hard-disk-drives/1/.

Shingled Magnetic Recording (SMR) Drives and Swift Object Storage, YouTube Video Presentation, Oct. 27, 2015, OpenStack Foundation, https://www.youtube.com/watch?v=sJe1EP70Ya0, Accessed Aug. 12, 2016.

Khurshudov, A., PhD, How HDD Workload Impacts TCO, Cloud Modeling and Data Analytics, Technology Paper, p. 1-4, Seagate, http://www.seagate.com/tech-insights/how-to-select-the-right-hdds-for-demanding-data-centers-master-ti/, Accessed Aug. 12, 2016.

Tokar, L., Garbage Collection and TRIM in SSDs Explained—An SSD Primer, Website, Apr. 16, 2012, p. 1-8, http://www.thessdreview.com/daily-news/latest-buzz/garbage-collection-and-trim-in-ssds-explained-an-ssd-primer/, Accessed Aug. 12, 2016.

Gerardnico, I/O—(Input/Output|Read/Write)—Data Access, Website, Last modified Dec. 14, 2018, p. 1-3, http://gerardnico.com/wiki/io/io, Accessed Aug. 12, 2016.

Hruska, J., How Do SSDs Work?, Website, Aug. 2, 2018, p. 1-13, http://www.extremetech.com/extreme/210492-extremetech-explains-how-do-ssds-work.

SCSI Commands Overview, Presentation, p. 1-34, University of New Hampshire, InterOperability Laboratory, https://www.iol.unh.edu/, Accessed Aug. 12, 2016.

Stevens, C., Shingled Magnetic Recording (SMR), IDEMA Presentation, p. 1-19, http://www.idema.org/wp-content/downloads/2212.pdf, Accessed Aug. 12, 2016.

* cited by examiner

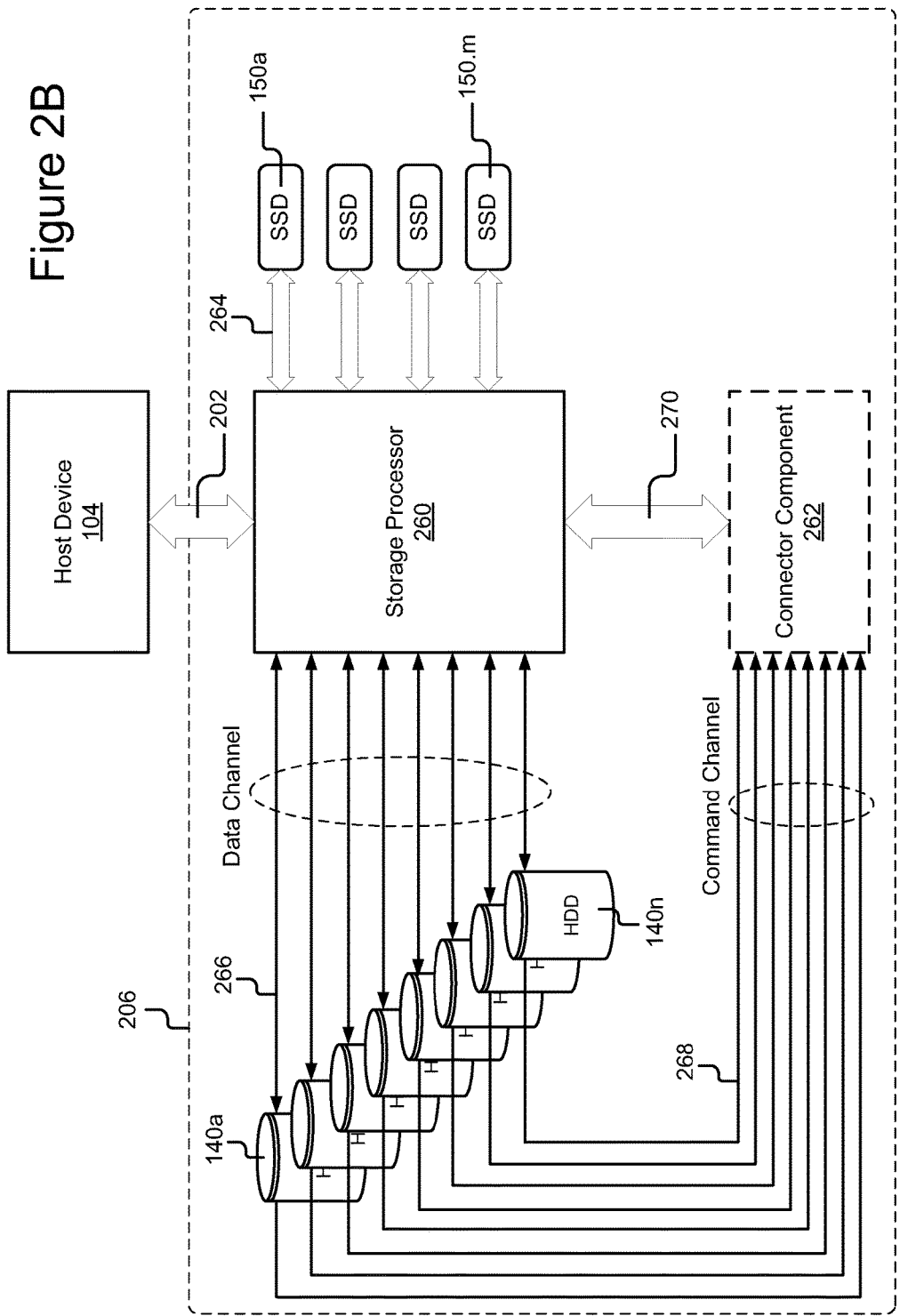

US 10,474,397 B2

UNIFIED INDIRECTION IN A MULTI-DEVICE HYBRID STORAGE UNIT

BACKGROUND

The present disclosure relates to a multi-device platform. In particular, the present disclosure relates, by way of non-limiting example, to a multi-device platform formed of a plurality of flash storage devices and magnetic storage devices.

Magnetic storage devices such as Hard Disk Drives (HDDs) are capable of providing a large storage capacity with low cost. However, because the HDD uses a read/write head attached to a mechanical arm to read or write data, the performance of the HDD is limited in terms of latency and access performance. Especially when the accessed file is fragmented and written across multiple sections of the magnetic disks or in the case of multiple initiators accessing the same device. Furthermore, in a HDD using shingle-written magnetic recording (SMR) technique, response time is dependent on internal operations such as garbage collection (GC). The amount of GC may vary significantly according to the availability of indirection memory. For example, when the indirection memory is almost full, the HDD requires GC. In particular, the HDD may need to perform defragmentation to reorder the writes to free up indirection memory. The latency variation caused by the decrease of indirection memory can significantly impact the performance of the service, and thereby impact the user experience.

Flash storage devices such as Solid States Drives (SSDs) are capable of providing low latency access performance. Because the memory cells of the SSD can be accessed simultaneously, the speed at which the SSDs read or write data can be much higher than the HDDs, even if the accessed file is fragmented and written sporadically across multiple cells. However, the SSD is considerably more expensive than the HDD in terms of cost per storage capacity.

Together with an increasing diversification of applications and services provided, modern Cloud data centers usually receive mixed multi initiator workloads. In many cases, these workloads change over time. This drives the need for a scaleable and more flexible storage solution which can take advantage of the lower cost of HDDs and the lower access performance of SSDs. Key value attributes are scalability and predictability.

SUMMARY

The present disclosure relates to systems and methods for implementing multi-device platforms. According to one innovative aspect of the subject matter in this disclosure, a system has one or more non-transitory hybrid storage device units, each hybrid storage device unit having a set of hybrid physical storage devices, the set of hybrid physical storage devices including one or more magnetic storage devices and one or more flash storage devices; and a storage processors coupled to the non-transitory hybrid storage device unit and storing a multi-device platform firmware, the multi-device platform firmware executable by the storage processor to: receive a host command including a logical address; determine a first hybrid storage device unit from the one or more hybrid storage device units based on the logical address; select a first plurality of physical storage devices from the set of hybrid physical storage devices of the first hybrid storage device unit; generate a plurality of device commands for the first plurality of physical storage devices based on the host command; and execute the plurality of device commands on the first plurality of physical storage devices.

In general, another innovative aspect of the subject matter described in this disclosure may be implemented in methods that include: receiving a host command including a logical address; determining a hybrid storage device unit based on the logical address, the hybrid storage device unit having a set of hybrid physical storage devices, the set of hybrid physical storage devices including one or more magnetic storage devices and one or more flash storage devices; selecting a first plurality of physical storage devices from the set of hybrid physical storage devices; generating a plurality of device commands for the first plurality of physical storage devices based on the host command; and executing the plurality of device commands on the first plurality of physical storage devices.

Other implementations of one or more of these aspects include corresponding systems, apparatus, and computer programs, configured to perform the actions of the methods, encoded on computer storage devices.

These and other implementations may each optionally include one or more of the following features.

For example, the features may include that selecting the first plurality of physical storage devices includes determining a type of physical storage device for executing the host command from a magnetic storage device type and a flash storage device type; responsive to the determined type of physical storage device being the magnetic storage device type, identifying one or more first magnetic storage devices included in the set of hybrid physical storage devices; determining an available storage capacity for each of the one or more first magnetic storage devices; and selecting one or more second magnetic storage devices from the one or more first magnetic storage devices based on the available storage capacity of each of the one or more first magnetic storage devices.

For example, the features may include that selecting the first plurality of physical storage devices includes determining a type of physical storage device for executing the host command from a magnetic storage device type and a flash storage device type; responsive to the determined type of physical storage device being the flash storage device type, identifying one or more first flash storage devices included in the set of hybrid physical storage devices; determining an amount of writes and an available storage capacity for each of the one or more first flash storage devices; and selecting one or more second flash storage devices from the one or more first flash storage devices based on the amount of writes and the available storage capacity of each of the one or more first flash storage devices.

For example, the features may include that the host command is associated with a data item, and the operations further include: determining a data type of the data item; identifying a predefined rule associated with the data type; and determining a type of physical storage device for the data item based on the data type and the predefined rule.

For example, the features may include that the host command is associated with a data item and specifies a device type for the data item, and the operations further include determining a type of physical storage device for the data item to be the device type specified in the host command.

For example, the features may include that the host command includes a write operation of a data item, and that generating the plurality of device commands includes: partitioning the data item into a plurality of data blocks based on the first plurality of physical storage devices; and generating a plurality of device write commands for writing the plurality of data blocks to the first plurality of physical storage devices.

For example, the operations further include: determining a frequency at which the logical address has been accessed; determining that the frequency satisfies a threshold frequency; determining that a data block associated with the logical address is stored in a magnetic storage device included in the set of hybrid physical storage devices; and relocating the data block to a flash storage device included in the set of hybrid physical storage devices.

For example, the operations further include: determining a frequency at which the logical address has been accessed; determining that the frequency satisfies a threshold frequency; determining that a data block associated with the logical address is stored in a flash storage device included in the set of hybrid physical storage devices; and relocating the data block to a magnetic storage device included in the set of hybrid physical storage devices.

For example, the features may include that the hybrid storage device unit has a unified indirection table for the set of hybrid physical storage devices, the unified indirection table including a plurality of mapping entries mapping logical addresses to physical addresses on the set of hybrid physical storage devices.

For example, the features may include that the unified indirection table is stored in a flash storage device included in the set of hybrid physical storage devices.

These implementations are particularly advantageous in a number of respects. For example, the technology describes herein utilizes multiple IO channels in transferring a data file with a multi-device platform (e.g., a device unit), and thus can effectively improve the data rate and reduce the latency caused by seek operation when processing host commands. Furthermore, the multi-device platform implements the multiple IO channels using conventional hardware components. No specialized hardware is needed and thus, the cost of the multi-device platform can be reduced.

As another example, the multi-device platform described herein is formed of multiple physical storage devices with an implementation of a unified host command queue and a unified indirection table commonly shared among these physical storage devices. Therefore, the multi-device platform is aware of the storage resources available on each physical storage device and can balance the resources in real-time or near real-time to minimize command delays and reduce latency variation. As a result, the multi-device platform described herein is capable of providing predictable performances desired for cloud storage applications these days. Furthermore, the present technology can also avoid single point of failure situation and reduce the occurrence of corner case scenarios in which one or more of the physical storage devices almost or completely run out of resources. The present technology is also capable of continuously processing the host commands even if a number of the physical storage devices need to go offline due to the necessity for background operation, maintenance, or replacement. Accordingly, on-going services such as video streaming can still proceed without interruption.

As another example, the ability to combine different types of storage media, e.g. HDD and SSD, at different ratios into one multi-device platform enables the present technology to flexibly adapt to the requirements of storage cost and performance specific to a data center. Furthermore, the present technology can effectively handle a mixture of random workloads from a diversified range of applications by selectively allocating them to appropriate physical storage devices included in the multi-device platform. The present technology also enables adjusting the data storage management according to the frequency of data access and changing requirements, either automatically or manually through application program interfaces (APIs). The multi-device platform as disclosed herein is particularly advantageous in multi-tenant access scenarios that employ virtualized servers and handle mixed unpredictable workloads.

It should be understood that language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 2B is a block diagram illustrating an example physical structure of a device unit representing a multi-device platform.

DETAILED DESCRIPTION

The present disclosure relates to systems and methods for implementing multi-device platforms. In particular, the systems and methods for transferring a data item with the multi-device platform and managing data placement among physical storage devices of the multi-device platform are described below. While the systems, methods of the present disclosure are described in the context of particular system architecture that uses flash storage devices and magnetic storage devices, it should be understood that the systems and methods can be applied to other architectures and organizations of hardware.

Figure 1:
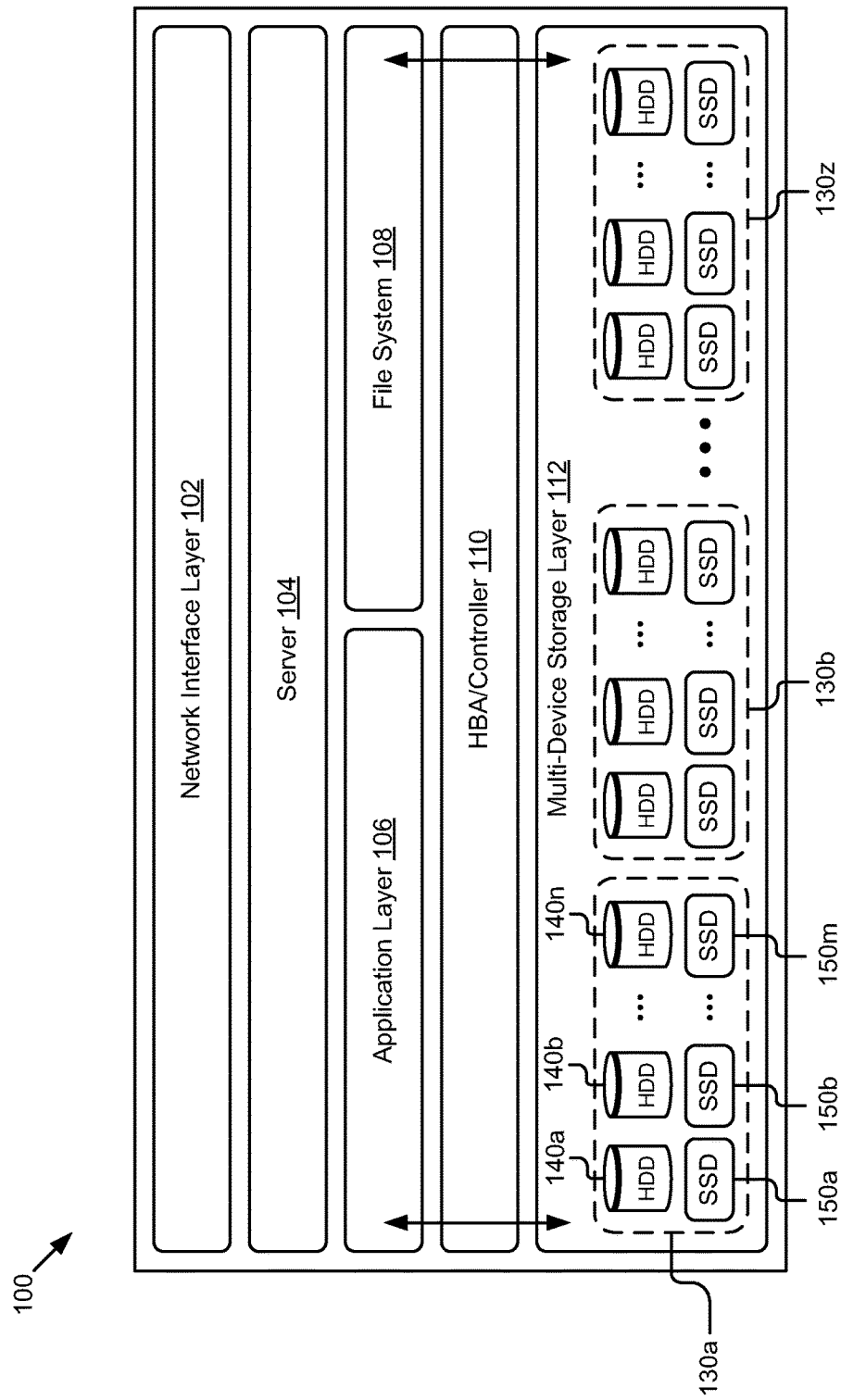
FIG. 1 is a block diagram illustrating an example system of a data center using a plurality of multi-device platforms according to the techniques described herein.

FIG. 1 is a block diagram illustrating an example system 100 of a data center using a plurality of multi-device platforms according to the techniques described herein. As depicted, in one embodiment, the system 100 may include a network interface layer 102, a server 104, an application layer 106, a file system 108, a Host Bus Adapter (HBA)/Controller 110, and a multi-device storage layer 112. In some embodiments, the multi-device storage layer 112 may include a data storage system having multiple device units 130a . . . 130z, each device unit represents an individual multi-device platform. In this present disclosure, the multi-device platform may also be referred to as the device unit. In FIG. 1 and the remaining figures, a letter after a reference number, e.g., "130*a*," represents a reference to the element having that particular reference number. A reference number in the text without a following letter, e.g., "130," represents a general reference to instances of the element bearing that reference number. It should be recognized that the present disclosure is not limited to this configuration and a variety of different system environments and configurations can be employed. Other embodiments may include additional or fewer components.

The network interface layer 102 is configured to connect the system 100 to a network and/or other systems (not shown). For example, network interface layer 102 may enable communication through one or more of the Internet, cable networks, wired or wireless networks using a variety of different communication protocols such as Transmission Control Protocol/Internet Protocol (TCP/IP), Hypertext Transfer Protocol (HTTP), Hypertext Transfer Protocol Secure (HTTPS), Simple Mail Transfer Protocol (SMTP), etc. In some embodiments, the network interface layer 102 may include a transceiver for sending and receiving signals using WiFi Bluetooth® or cellular communications for wireless communication. The network interface layer 102 may be coupled to other components of the system 100 (e.g., device units 130 of the multi-device storage layer 112) for distribution and/or retrieval of data files and/or media objects stored in the device units 130.

The server 104 is configurable to run a plurality of different applications that provide online services to the end users. In some embodiments, the server 104 may be coupled to client devices of the users via the network and receive requests for service from the users through the network interface layer 102. As an example, the server 104 may receive a request to retrieve a stored data file from a user of a cloud storage application hosted by the server 104. The server 104 may transmit the request to the corresponding cloud storage application. The cloud storage application may process the request, retrieve the requested data file from a device unit 130 of the multi-device storage layer 112, and return the data file to be provided to the user. From perspective of the device units, the server 104 hosting the applications is considered a host system or a host device.

The application layer 106 includes a variety of different applications commonly sharing physical and virtual resources of the system 100. In some embodiments, the applications may process incoming requests from the users to provide corresponding responses. In particular, the applications may analyze the incoming request and generate host commands (also referred to herein as IO requests) for reading or writing corresponding data items to the device units 130. For example, in the above instance, the cloud storage application may analyze the user request, determine that the data file to be retrieved is stored at a logical address of 33,087, and generate a host read command for reading the data file located at the determined logical address. The requested data file is retrieved and transmitted to the client device associated with the requesting user. In some embodiments, the applications included in the application layer 106 may be separate from each other and may be provided by different online service providers. Examples of the applications include, but are not limited to, cloud storage application, data mining application, online shopping service, video streaming service, email service, web service, etc.

The file system 108 is configured to manage the data stored in the multiple device units 130 at a system level. In some embodiments, the file system 108 may manage system-wide metadata used for performing read and write operations on the device units. As an example, in some embodiments, the file system 108 may provide a table of device unit address defining a range of logical addresses associated with each device unit of the multi-device storage layer 112. For example, the table of device unit address may indicate a space of logical addresses provided by the multi-device storage layer 112 as (Device unit A: 1-10,000, Device unit B: 10,001-25,000, Device unit C: 25,001-50,000). In some embodiments, the range of logical address associated with each device unit may be established during the configuration process. The ranges of logical address may be reconfigured and the table of device unit address may be updated accordingly. In some embodiments, the file system 108 may also generate host commands to perform background tasks. For example, the file system 108 may generate a host copy command for copying data files stored in a first device unit to a second device unit to perform data replication. Examples of the background operations include, but are not limited to, data replication, data recovery, data scrubbings, measuring and monitoring writing amplification, etc.

The HBA/Controller 110 is configured to provide and control connections with the multi-device storage layer 112. For example, the HBA/Controller 110 may provide access to the device units 130 of the multi-device storage layer 112 using a variety of different storage protocols such as Fibre Channel (FC), Small Computer System Interface (SCSI), serial-attached SCSI (SAS), serial Advanced Technology Attachment (SATA), Peripheral Component Interconnect Express (PCIe), TCP/IP (fabric), etc.

The multi-device storage layer 112 may include a plurality of multi-device platforms 130. Each multi-device platform 130 may represent itself to the system 100 as an individual device unit for storing data. As discussed elsewhere herein, the multi-device platform 130 may be referred to as the device unit 130. In some embodiments, each device unit 130 may include a plurality of physical storage devices with different types of non-transitory, non-volatile storage media. The device unit 130 may therefore be referred to herein as hybrid storage device unit. For example, as depicted in FIG. 1, the device unit 130 may include n magnetic storage devices (140*a* . . . 140*n*) and m flash storage devices (150*a* . . . 150*m*). The implementation of multiple physical storage devices provides the device unit with the ability to execute the host commands even if a number of physical storage devices are currently unavailable. As a result, the services provided to the user are not interrupted and the issue of single point of failure can be eliminated. The number of magnetic storage devices n and the number of flash storage devices m may be different between different device units. In some embodiments, each device unit 130 may include six to twelve physical storage devices to avoid overwhelming the system with the amount of overhead, the amount of internal communication bandwidth, and the hardware resource used to efficiently manage these physical storage devices. It should be understood that other numbers of physical storage devices included in a single device unit are also possible and contemplated.

In some embodiments, the flash storage devices and the magnetic storage devices of the multi-device storage layer 112 may be arranged separately in different racks of the server 104. The total number of flash storage devices (e.g., SSDs) and the total number of magnetic storage devices (e.g., HDDs) provided for the server 104 may vary depending on the desired cost and latency requirements of the system 100. In some embodiments, these SSDs and HDDs may be aggregated in different combinations to establish different device units. It should be recognized that a device unit may include only HDD(s), only SSD(s), or a combination of HDD(s) and SSD(s). In some embodiments, one physical storage device may be included in multiple device units.

In some embodiments, the multi-device storage layer 112 is configured to identify what device unit among the plurality of device units 130a . . . 130z to process the host command, e.g., using the table of device unit address provided by the file system 108. Continuing the above example, the multi-device storage layer 112 may receive the host read command generated by the cloud storage application for retrieving the data item stored at the logical address of 33,087. The multi-device storage layer 112 may reference the table of device unit address and determine that logical address 33,087 is associated with Device unit C. The multi-device storage layer 112 may then allocate the host read command to Device unit C to be processed.

In some embodiments, the host command may be related to a plurality of device units. For example, the cloud storage application may generate a host copy command for copying a data item stored at the logical address 33,087 to a logical address of 1,795. The multi-device storage layer 112 may compare these logical addresses to the table of device unit address and determine that the logical address 33,087 is associated with Device unit C while the logical addresses of 1,795 is associated with Device unit A. The multi-device storage layer 112 may send the host copy command to the source device unit (e.g., Device unit C) to read the data item stored at the logical address 33,087. The source device unit (e.g., Device unit C) may then transmit that data item together with the host copy command to the destination device unit (e.g., Device unit A) to write the data item at the logical addresses of 1,795 and complete the processing.

Figure 2A:
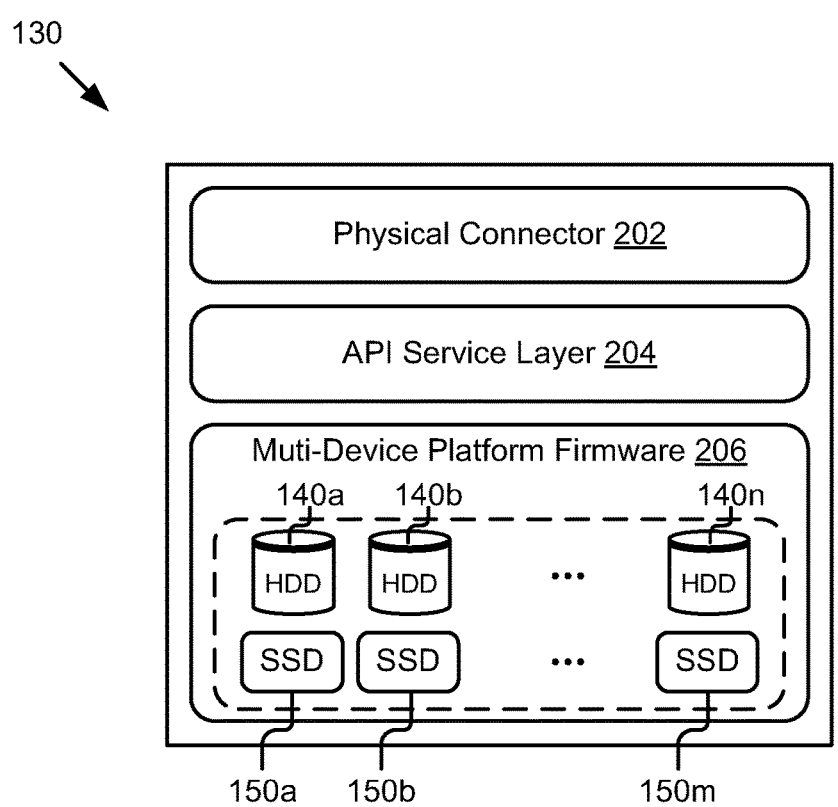
FIG. 2A is a block diagram illustrating an example logical structure of a device unit representing a multi-device platform.

FIG. 2A is a block diagram illustrating an example logical structure of a device unit 130 representing a multi-device platform. As depicted in FIG. 2A, in one embodiment, the logical structure of the device unit 130 may include a physical connector 202, an API service layer 204, a multi-device platform firmware 206, and a set of physical storage devices including the magnetic storage devices 140 (also referred to herein as the HDDs 140) and the flash storage devices 150 (also referred to herein as the SSDs 150).

The physical connector 202 is configured to communicatively connect the device unit 130 with the host system (e.g., the server 104). In some embodiments, the physical connector 202 may be a PCIe switch and may couple the device unit 130 to the server 104 via the HBA/Controller 110. Other interface standards compatible with the physical storage devices of the device unit 130 may be used.

The API service layer 204 is configured to provide the APIs for the applications in the application layer 106 to adjust the data storage management of the device unit 130 as needed by the service providers. As an example, the API service layer 204 may provide a cloud storage application with an API that enables its service provider to dynamically modify predefined rules implemented by the device unit. For example, the service provides may use an API request to modify a predefined rule that specifies which types of data should be stored in the HDDs, and which types of data should be stored in the SSDs of the device unit.

The multi-device platform firmware 206 is configured to provide the functionality for transferring data with the plurality of physical storage devices of the device unit 130. In some embodiments, the multi-device platform firmware 206 may be a unified firmware that commonly manages operations of the plurality of physical storage devices. The multi-device platform firmware 206 can be implemented using programmable or specialized hardware, for example, a field-programmable gate array (FPGA) or an application-specific integrated circuit (ASIC). In some embodiments, the multi-device platform firmware 206 can be implemented using a combination of hardware and software. The multi-device platform firmware 206 is described in more detail below.

The set of physical storage devices of the device unit 130 may include a plurality of physical storage devices, which may be non-transitory, computer-usable (e.g., readable, writeable, etc.) media. Because the set of physical storage devices may include physical storage devices of different device types (e.g., magnetic storage device type (HDD), flash storage device type (SSD), etc.), the set of physical storage devices may be referred to herein as the set of hybrid physical storage devices. The physical storage devices may contain, store, communicate, propagate, or transport data, instructions, computer programs, software, code routines, etc., for processing by or in connection with a storage processor as described below. In some embodiments, the set of physical storage devices may include flash storage devices and magnetic storage devices. The flash storage devices may include NAND-based flash memories, NOR-based flash memories, single-level cell (SLC) flash memories, multi-level cell (MLC) flash memories, or any combination thereof. The magnetic storage devices may include HDDs with hard disk interface of SAS (serial-attached SCSI), SATA (serial Advanced Technology Attachment), etc., or any combination thereof. While the physical storage devices described in the present disclosure include flash storage devices and magnetic storage devices, it should be understood that memory devices with other types of storage media are also possible and contemplated.

FIG. 2B is a block diagram illustrating an example physical structure of a device unit 130 representing a multi-device platform. As depicted in FIG. 2B, the physical structure of the device unit 130 may include the multi-device platform firmware 206 communicatively coupled to the host device (e.g., the server 104) via the physical connector 202. As discussed elsewhere herein, the physical connector 202 may be a PCIe interface. From the hardware perspective, the multi-device platform firmware 206 may be stored and executed on a storage processor 260 to provide the functionality for reading and writing data to the HDDs 140 and the SSDs 150.

In some embodiments, each of the HDDs 140 may be coupled to the storage processor 260 via two ports. The first port may be a data port directly connected to the storage processor 260 for transferring data items via a data channel 266. The second port may be a command port for monitoring the internal state (e.g., the storage resources currently available) of the HDD. In some embodiments, the second port may be directly connected to the storage processor 260 via a command channel 268. In other embodiments, the second ports may be connected to the storage processor 260 via a connector component 262. In some embodiments, the connector component 262 may be a SAS expander that provides additional ports to connect a large number of devices to the storage processor 260. The connector component 262 is optional in some embodiments, and thus, is shown with dashed lines in FIG. 2B. In some embodiments, the connector component 262 may be connected to the storage processor 260 via PCIe interface, e.g., PCIe bus 270.

In some embodiments, the data channels 266 may be parallel to each other and capable of transferring data with the storage processor 260 simultaneously. Each data channel 266 may be considered an IO channel for reading and writing data to the corresponding HDD 140. Accordingly, the storage processor 260 may have multiple IO channels to use simultaneously in reading or writing a single data file to multiple corresponding HDDs. The implementation of multiple IO channels can significantly improve the overall data rate of the device unit 130 as described in further detail below. By way of example and not limitation, the data channels 266 and the command channels 268 may be communication channels with a transfer rate of 6 Gbps, although numerous other transfer rates are applicable.

In some embodiments, the SSDs 150 may be coupled to the storage processor 260 via PCIe interface, e.g., PCIe bus 264. Each bus 264 may be considered an IO channel for reading and writing data to the corresponding SSD 150. Accordingly, the storage processor 260 may have multiple IO channels to use simultaneously in reading or writing a single data file to multiple corresponding SSDs. In some embodiments, a number of the SSDs 150 may have a portion of their storage capacity being reserved as indirection memory for storing a unified indirection table.

In some embodiments, the unified indirection table may include a plurality of mapping entries that associate logical addresses to physical addresses on the set of physical storage devices (e.g., the HDDs 140 and SSDs 150) of the device unit. In some embodiments, the logical address may be an address used by the host device to read and write data to the device units without being aware of actual location (e.g., the physical address) of the data on the HDDs 140 and SSDs 150. In some embodiments, the physical address may be an address used internally within the device unit and transparent to the host device. In particular, the physical address may indicate the location of a storage unit on a HDD 140 or a SSD 150. A storage unit on a HDD 140 may be a physical sector and may be located using a physical address in the form of a Device ID-Cylinder ID-Head ID-Sector ID value. A storage unit on a SSD 150 may be a physical memory cell and may be located using a physical address in the form of a Device ID-Cell ID value. In these embodiments, "Device ID," "Cylinder ID," "Head ID," "Sector ID," "Cell ID" may be an identifier (e.g., a symbol, a code, a number, a value, etc.) that uniquely identifies the respective storage component. The mapping information may be needed in performing the reads/writes on the device unit. Therefore, storing the unified indirection table on the SSD(s) is particularly advantageous because it avoids seek operations on the HDDs and allows much faster access to the mapping information.

As described above, the mapping entry in the unified indirection table may include the mappings between each logical address to one or more physical addresses where the corresponding data item is stored. In some embodiments, the corresponding data item may be partitioned into multiple data blocks and the multiple data blocks may be stored at different physical addresses on one or more physical storage devices of the device unit. In these embodiments, a physical address of a data block in the mapping entry may localize the start point of the data block, e.g., the storage unit (sector or memory cell) associated with its first byte. The mapping entry may include the physical address and the block size for each data block of the data item. As an example, a data item (e.g., an 8 MB video file) may be stored at the logical address of 33,087. The data item may be divided into three data blocks and stored at three different locations on the HDDs. The unified indirection table may include three following mapping entries for the logical address 33,087:

Logical address (33,087): Physical address 1 (Device 1—Cylinder 1-Head 2-Sector 2): 3 MB Logical address (33,087): Physical address 2 (Device 6—Cylinder 3-Head 14-Sector 1): 2 MB Logical address (33,087): Physical address 3 (Device 9—Cylinder 1-Head 2-Sector 63): 3 MB As illustrated, the mapping entries indicate that the video file stored at logical address 33,087 is partitioned into three data blocks and stored at three physical addresses on three different HDDs. In particular, the first data block is 3 MB in size and stored in HDD (Device 1) with the first byte stored at the sector (Cylinder 1-Head 2-Sector 2). The second data block is 2 MB in size and stored in HDD (Device 6) starting at the sector (Cylinder 3-Head 14-Sector 1). The third data block is 3 MB in size and stored in HDD (Device 9) starting at the sector (Cylinder 1-Head 2-Sector 63). In this example, the data blocks of the data item are stored in three different physical storage devices. However, it should be understood that these data blocks can be stored in the same physical storage device. If the data blocks are stored in the same HDD, they may preferably be stored sequentially or on the same cylinder of the HDD to minimize the amount of seek operation required. In another example, the data blocks of the data item may be stored in multiple SSDs. It should also be understood that in some embodiments, the data blocks of the same data item may be stored in both HDDs and SSDs.

Figure 3:
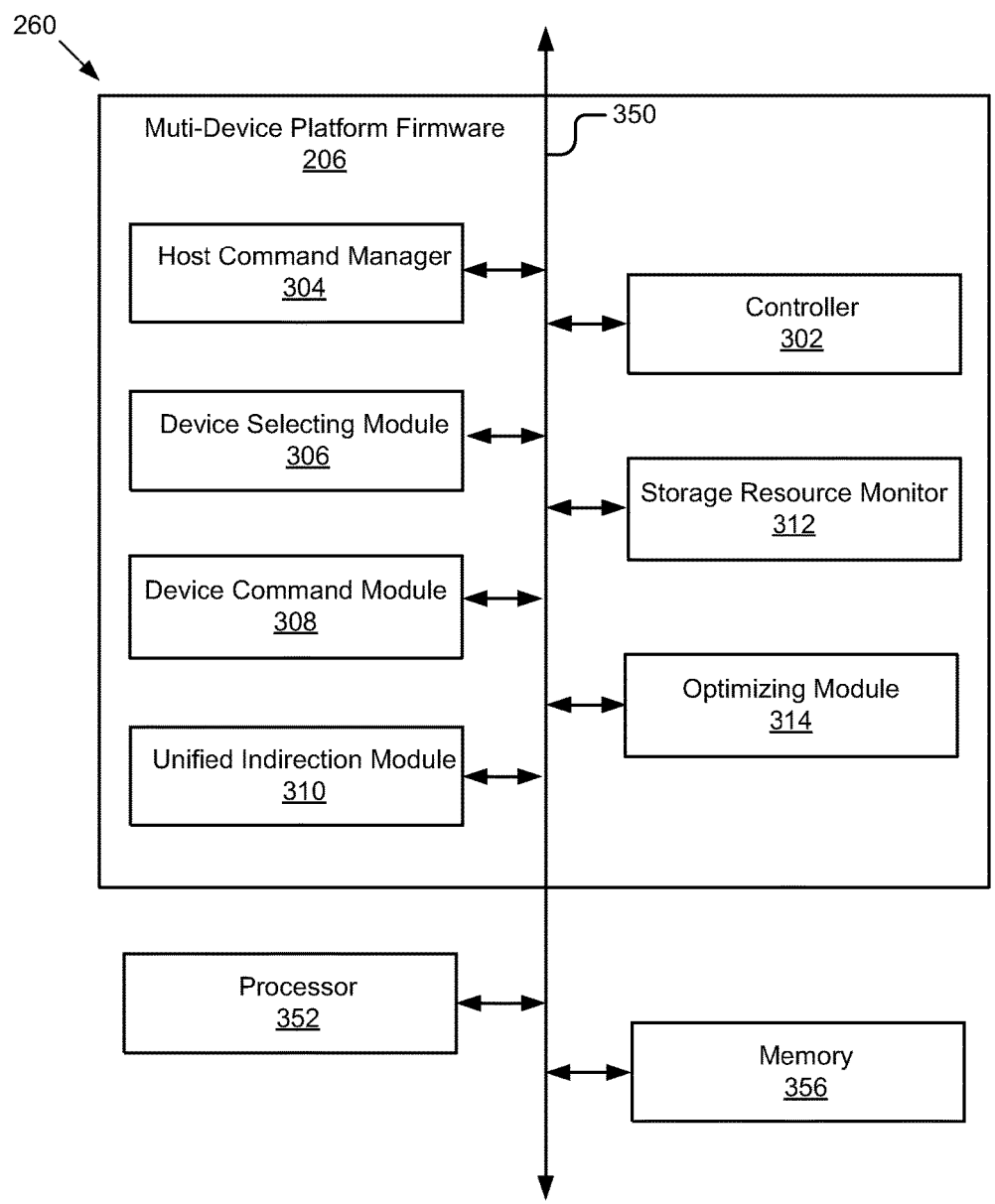
FIG. 3 is a block diagram illustrating an example storage processor.

FIG. 3 is a block diagram illustrating an embodiment of the storage processor 260 including the multi-device platform firmware 206. As depicted in FIG. 3, the storage processor 260 may also include a processor 352 and a memory 356 according to some examples. The components of the storage processor 260 are communicatively coupled to a bus 350 for communicating with each other, which may include any type of communications bus and/or software communication mechanism.

The processor 352 may execute software instructions by performing various input/output, logical, and/or mathematical operations. The processor 352 may have various computing architectures to process data signals including, for example, a complex instruction set computer (CISC) architecture, a reduced instruction set computer (RISC) architecture, and/or an architecture implementing a combination of instruction sets. The processor 352 may be physical and/or virtual, and may include a single processing unit or a plurality of processing units and/or cores. In some embodiments, the processor 352 may be capable of performing complex tasks, e.g., generating and executing device commands for reading and writing data items. In some implementations, the processor 352 may be coupled to the memory 356 via the bus 350 to access data and instructions therefrom and store data therein. The bus 350 may couple the processor 352 to the other components of the storage processor 260 including, for example, the multi-device platform firmware 206. It should be understood that other processors, operating systems, sensors, displays and physical configurations are possible.

The memory 356 may store and provide access to data for the other components of the storage processor 260. In some embodiments, the memory 356 may be included in a processor 352 or distributed among a plurality of processors 352. In some embodiments, the memory 356 may be included in one or more physical storage devices of the device unit. The memory 356 may store instructions and/or data that may be executed by the processor 352. The instructions and/or data may include code for performing the techniques described herein. For example, in some embodiments, the memory 356 may store the multi-device platform firmware 206. The memory 356 is also capable of storing other instructions and data, including, for example, an operating system, hardware drivers, other software applications, databases, etc. As an example, the memory 356 may store a list of physical storage devices managed by the multi-device platform firmware 206 together with their associated types of storage media (e.g., HDD or SSD). In some embodiments, the memory 356 may also store the predefined rules implemented by the multi-device platform firmware 206. The memory 356 may be coupled to the bus 350 for communication with the processor 352 and the other components of the storage processor 260.

The memory 356 may include one or more non-transitory computer-usable (e.g., readable, writeable) device, a static random access memory (SRAM) device, an embedded memory device, a discrete memory device (e.g., a PROM, FPROM, ROM), a hard disk drive, a solid state drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 352. In some embodiments, the memory 356 may include one or more of volatile memory and non-volatile memory. For example, the memory 356 may include, but is not limited to, one or more of a dynamic random access memory (DRAM) device, a static random access memory (SRAM) device, an embedded memory device, a discrete memory device (e.g., a PROM, FPROM, ROM), a hard disk drive, a solid state drive, an optical disk drive (CD, DVD, Blu-ray™, etc.). It should be understood that the memory 356 may be a single device or may include multiple types of devices and configurations.

The multi-device platform firmware 206 may include software and/or logic to provide the functionality for receiving a host command assigned to the device unit 130 by the multi-device storage layer 112, selecting a plurality of physical storage devices among the set of physical storage devices of the device unit 130, generating a plurality of device commands for the plurality of selected physical storage devices, and executing the plurality of device commands on the plurality of selected physical storage devices.

In some embodiments, the multi-device platform firmware 206 may include a controller 302, a host command manager 304, a device selecting module 306, a device command module 308, a unified indirection module 310, a storage resource monitor 312, and an optimizing module 314. The components of the multi-device platform firmware 206 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 352. In some embodiments, the components are instructions executable by the processor 352. In some implementations, the components are stored in the memory 356 and are accessible and executable by the processor 352.

The controller 302 may include software and/or logic to control the operation of other components of the multi-device platform firmware 206. The controller 302 controls the other components of the multi-device platform firmware 206 to perform the methods described below with reference to FIGS. 4-7B. In some implementations, the processor 352, the memory 356, and other components of the multi-device platform firmware 206 can cooperate and communicate without the controller 302.

In some embodiments, the controller 302 may send and receive data, to and from the host device, e.g., the server 104. For example, the controller 302 may receive a host read command for reading a data item from an application hosted by the server 104 and send the host read command to the host command manager 304. In another example, the controller 302 may receive a data item (e.g., a media object) that the device command module 308 read from one or more physical storage devices and send the data item to the host device. In some embodiments, the data item can be a computer file or a portion of a computer file containing data, settings, codes, configurations, etc. As an example, the data item may be a data file with the file content including text, image, video, audio, etc. The data file may also be a webpage, an email message, a data record, a calendar item, etc. In another example, the data item may be a configuration file specifying operations of an application, or a directory file defining a structure of a file system. Other types of electronic files that can be used by a computer-implemented device are also possible and contemplated.

In some embodiments, the controller 302 may receive data from the host device and/or other components of the multi-device platform firmware 206 and store the data in the memory 356. As an example, the controller 302 may receive a newly created rule or an update to an existing predefined rule from an application hosted by the host device via an API request. The controller 302 may then send the data to the memory 356 to store the new rule as a predefined rule or to cause the existing predefined rule to be updated. In some embodiments, the predefined rules may be rules implemented by the components of the multi-device platform firmware 206 in storing data and managing the data placement. For example, the predefined rule may specify which types of data are stored in magnetic storage device and which types of data are stored in flash storage device. In some embodiments, the predefined rule may specify operations performed by the multi-device platform firmware 206. For example, the predefined rule may specify that the multi-device platform firmware 206 perform background operations (e.g., garbage collection on SSDs, defragmentation on HDDs, etc.) when an average number of host commands received during a period of time is below a threshold number. In another example, the predefined rule may specify that the multi-device platform firmware 206 only perform background tasks between 1 am and 3 am on Tuesday and Thursday every week. The predefined rules allow the operations of the device units 130 to be customized as needed over time, e.g., by using API requests. As a result, the device units 130 are capable of providing predictable performances.

In some embodiments, the controller 302 may receive data from the physical storage devices and send the data to other components of the multi-device platform firmware 206. For example, the controller 302 may receive data indicating that the Device HDD2 is currently offline for maintenance via the command channel 268 and another data indicating that the Device SSD3 is currently offline for background operation via the bus 264. The controller 302 may then transmit the data to the storage resource monitor 312 to update the current availability of the Device HDD2 and the Device SSD3 accordingly.

In some embodiments, the controller 302 may retrieve data from the memory 356 and send the data to other components of the multi-device platform firmware 206. For example, the controller 302 may receive a predefined rule from the memory 356, and transmit the predefined rule to the device selecting module 306 for selecting physical storage devices.

In some embodiments, the controller 302 may generate and/or maintain an access performance model for each device (for determining data zones and/or spatial data placements), and classify the incoming data requests. In some instances, the controller 302 may classify requests as higher or lower priority, comparatively, and store data associated with the requests in a corresponding performance zone (on an HDD 140 or SSD 150) based on the priority. A higher priority may reflect data likely to be accessed sooner than a lower priority, which is likely to be accessed later, comparatively. As a further example, the controller 302, based on the access probability, may place the data into correspond performance zone or replicate it on multiple devices. Further, the controller 302 may select SSD caching or hybrid HDD caching strategy to balance between the latency and the induced indirection/garbage collect, cache data based on data access frequency, store data in a performance zone based on a performance classification (e.g., classify a data item into one of the following data classes: high performance (where it may be stored in NAND); medium performance (where it may be stored in NAND or/or high-availability zone in HDD); low performance (where it may be stored in a conventional zone in HDD), etc.

The host command manager 304 may include software and/or logic to provide the functionality for managing a unified host command queue. In some embodiments, the unified host command queue may be commonly used among the physical storage devices of the device unit.

In particular, the unified host command queue may include a plurality of host commands to be executed on one or more of the HDDs 140 and/or the SSDs 150. In some embodiments, the host command may be an IO request generated by an online application hosted by the server 104 or by the file system 108 for transferring a data item with the physical storage devices. For example, the host command may be a host read command, a host write command, a host copy command, a host move command, or a host delete command. Other types of host command are also possible and contemplated. In some embodiments, the host command may include one or more logical addresses specifying the location of the corresponding data. As an example, a host copy command may include a source logical address indicating a location where the data item is currently stored and a destination logical address indicating a location where a copy of the data item is to be stored. In some embodiments, if the host command includes a write operation of the data item (e.g., the host write command), the data item may be included in the host command. In these embodiments, the host command may also include a data type value describing nature of the data item, e.g., highly time-sensitive, relatively time-sensitive, non-time-sensitive, etc. In some embodiments, the host command also may include a device type value specifying the type of physical storage device (HDD or SSD) where the data item should be stored.

In some embodiments, the host command manager 304 may receive an incoming host command from the controller 302 and update the unified host command queue to include the incoming host command. In some embodiments, the host command manager 304 may select a host command from the unified host command queue to be processed. As an example, the host commands in the unified host command queue may be executed on a first come first serve basis. In another example, the commands in the unified host command queue may be executed in an order based on priority. In some embodiments, the host command manager 304 may assign a priority value to the host command and execute the host command having higher priority value first. The priority value may be assigned based on the online application generating the host command. For example, a host command generated by a real-time service, e.g., video conference, may be given a priority value higher than a host command from an application providing a data mining service, and thus, may be processed beforehand. The priority value of the host command may be determined based on other factors.

In some embodiments, the host command manager 304 may monitor a frequency of access associated with each logical address. In particular, the host command manager 304 may determine the number of times a logical address is included in the host commands received during a window of time. For example, the host command manager 304 may determine that the logical address 33,087 has been accessed 150 times in the last four hours with 79 host read commands, 60 host write commands, 10 host copy commands, and 1 host move command. The frequency of access may indicate a data temperature within the system 100 of the data item stored at the logical address. In particular, the data items at the logical address that are frequently accessed, less-frequently accessed, and rarely accessed may be considered hot data, warm data, and cold data, respectively. In some embodiments, the frequency of access may be computed periodically for different periods of time, e.g., an hour, two days, three weeks, etc.

In some embodiments, if the selected host command is a host read command, host delete command, host copy command, or host move command, the host command manager 304 may send the selected host command to the device command module 308 for execution. In some embodiments, if the selected host command is a host write command, the host command manager 304 may send the selected host command to the device selecting module 306 for determining the physical storage devices on which the selected host command is to be executed. In some embodiments, the host command manager 304 may send the frequency of access associated with each logical address to the optimizing module 314 for optimizing the placement of data. In some embodiments, the host command manager 304 may store the frequencies of access in the memory 356.

The device selecting module 306 may include software and/or logic to provide the functionality for selecting physical storage devices from the set of physical storage devices associated with the device unit. In particular, the device selecting module 306 may select the physical storage devices from the HDDs 140 and the SSDs 150 of the device unit for processing a host command including a write operation of a data item. In some embodiments, the host command may require a write operation. For example, the execution of a host write command may include writing a data item to a logical address indicated in the host command. In another example, the execution of a host copy command (or a host move command) may include writing a data item to be copied (or moved) to a destination logical address indicated in the host command.

In some embodiments, the device selecting module 306 may select a plurality of first physical storage devices to write the data item from the set of physical storage devices of the device unit. In particular, the device selecting module 306 may determine the type of physical storage device to write the data item, e.g., magnetic storage device type (HDD) or flash storage device type (SSD). The device selecting module 306 may then select the plurality of first physical storage devices from the HDDs 140 or the SSDs 150 of the device unit based on determined type of physical storage devices and other factors.

In some embodiments, the device selecting module 306 may determine the type of physical storage device for writing the data item based on the host command, a predefined rule, or a default setting. It should be understood that these determinations may be performed in any order and other applicable variations may be used.

In some embodiments, the device selecting module 306 may determine whether the host command specifies a device type for storing the data item. If the host command specifies the device type for the data item, the device selecting module 306 may determine the type of physical storage device for the data item to be the device type specified in the host command. For example, the host write command may include a device type value indicating that the device type for the corresponding data item is SSD. The device selecting module 306 may then set the type of physical storage device for writing the data item as SSD according to the host write command.

In some embodiments, if the host command does not specify the device type, the device selecting module 306 may determine the data type of the data item included in the host command. In some embodiments, the data type of the data item may be determined based on its file type. For example, the device selecting module 306 may determine the data type of the data item as a data file, a configuration file, a directory file, etc. based on the file extension. In some embodiments, the device selecting module 306 may determine the data type of the data item based on the application that generates the host command. For example, the device selecting module 306 may determine the data type of the data item as a data item of cloud storage application, a data item of a data mining application, a data item of a video streaming application, etc. In some embodiments, the device selecting module 306 may determine the data type of the data item based on characteristics of the data item as indicated by the data type value in the host command. For example, the device selecting module 306 may determine the data type of the data item as highly time-sensitive, relatively time-sensitive, or non-time-sensitive. Other data types and other criteria for categorizing the data item into the data types are also possible and contemplated.

After determining the data type of the data item in the host command, the device selecting module 306 may identify a predefined rule associated with the data type. If the predefined rule associated with the data type of the data item is identified, the device selecting module 306 may determine the type of physical storage device for the data item based on the data type and the corresponding predefined rule. For example, the device selecting module 306 may determine the data type of the data item in the host write command as non-time-sensitive. The device selecting module 306 may then retrieve a set of predefined rules from the memory 356 and identify that the set of predefined rule includes a rule corresponding to the non-time-sensitive data items. As an example, the rule may specify that data items classified as non-time-sensitive are stored on HDD. The device selecting module 306 may then set the type of physical storage device for writing the data item as HDD according to the data type of non-time-sensitive and the predefined rule corresponding to that data type. Determining the type of physical storage device based on the data type included in the host command is particularly advantageous because it allows the multi-device platform firmware 206 to handle incoming random workloads with different data types efficiently and predictably, thereby reducing latency variations in processing the host commands.

In some embodiments, if the data type of the data item in the host command does not have a corresponding predefined rule, the device selecting module 306 may set the type of physical storage device based on default. In some embodiments, the default type of physical storage device may be HDD. In other embodiments, the default type of physical storage device may be SSD. In the above example, assuming that the set of predefined rules retrieved from the memory 356 does not include a rule applied to the data type of non-time-sensitive and the default type of physical storage device is established as SSD. In this situation, the device selecting module 306 may set the type of physical storage device for writing the data item as SSD according to the default setting.

In some embodiments, after determining the type of physical storage device, the device selecting module 306 may select a plurality of first physical storage devices of the determined type for writing the data item associated with the host command. The plurality of first physical storage devices may be selected based on their available resources, e.g., the available storage capacity, the amount of writes, etc. Different types of resources may be used as selection criteria depending on which type of physical storage device is determined for writing the data item.

In the first scenario where the determined type of physical storage device for executing the host command is HDD, the device selecting module 306 may identify the HDDs included in the set of physical storage devices of the device unit. In particular, the device selecting module 306 may identify HDDs 140a . . . 140n as candidate physical storage devices. In some embodiments, the device selecting module 306 may receive the available storage capacity associated with each HDD from the storage resource monitor 312 and select the plurality of first physical storage devices from the candidate HDDs based on the available storage capacity of the plurality of first physical storage devices. In some embodiments, the available storage capacity of each HDD may be measured by the remaining storage capacity of the HDD or the ratio between the remaining storage capacity and the total storage capacity of the HDD. In some embodiments, the device selecting module 306 may select a predetermined number of HDDs that have the largest available storage capacity. Alternatively, the device selecting module 306 may select the HDDs that have the available storage capacity satisfies a threshold value. In some embodiments, the device selecting module 306 may exclude the HDDs currently unavailable due to background operation (e.g., defragmentation), maintenance or replacement. Those currently unavailable HDDs may be eliminated prior to or subsequent to the selection of HDDs from the HDDs 140.

As an example, assuming that the device unit has a set of physical storage devices including five HDDs (Device HDD1, Device HDD2, Device HDD3, Device HDD4, Device HDD5) and three SSDs (Device SSD1, Device SSD2, Device SSD3). In response to the determined type of physical storage devices being HDD, the device selecting module 306 may select the five HDDs and receive the available storage capacity on each HDD from the storage resource monitor 312 as follow: (Device HDD1: 560 GB, Device HDD2: 3.5 TB, Device HDD3: 1.3 TB, Device HDD4: 130 GB, Device HDD5: 1.5 GB). In some embodiments, the device selecting module 306 may select top three HDDs that have the largest amount of available storage capacity. Accordingly, the device selecting module 306 may select Device HDD2, Device HDD3, and Device HDD5. In other embodiments, the device selecting module 306 may select the HDDs that have the amount of available storage capacity higher than 500 GB. Accordingly, the device selecting module 306 may select Device HDD1, Device HDD2, Device HDD3, and Device HDD5. In this example, assuming that the data describing available resources received from the storage resource monitor 312 indicates that Device HDD5 is currently running background tasks. The device selecting module 306 may then eliminate the Device HDD5 from the selected HDDs and return (Device HDD1, Device HDD2, Device HDD3) as the plurality of first physical storage devices for executing the host command.

In the second scenario where the determined type of physical storage device for executing the host command is SSD, the device selecting module 306 may identify the SSDs included in the set of physical storage devices of the device unit. In particular, the device selecting module 306 may identify SSDs 150a . . . 150m as candidate physical storage devices. In some embodiments, the device selecting module 306 may receive the available storage capacity and the amount of writes associated with each SSD from the storage resource monitor 312. The device selecting module 306 may then select the plurality of first physical storage devices from the candidate SSDs based on the available storage capacity and the amount of writes of the plurality of first physical storage devices. In some embodiments, the available storage capacity of each SSD may be measured by the remaining storage capacity of the SSD or the ratio between the remaining storage capacity and the total storage capacity of the SSD. In some embodiments, the amount of writes may be a ratio between total bytes actually written on the SSD (e.g., taking into account the write amplification) and the write endurance of the SSD. The write endurance may be different for each SSD and may specify the Total Byte Written (TBW) that particular SSD can tolerate in its lifetime before becoming unreliable.

In some embodiments, the device selecting module 306 may select a predetermined number of SSDs that have the largest of available storage capacity. Alternatively, the device selecting module 306 may select the SSDs that have the available storage capacity satisfies a threshold capacity. In some embodiments, the device selecting module 306 may select a predetermined number of SSDs that have the lowest amount of writes. Alternatively, the device selecting module 306 may select the SSDs that have the amount of writes satisfies a threshold amount of writes. In some embodiments, the device selecting module 306 may select a predetermined number of SSDs that have the highest ratio between the available storage capacity and the amount of writes. Alternatively, the device selecting module 306 may select the SSDs that have the ratio between the available storage capacity and the amount of writes satisfies a threshold ratio. In some embodiments, the device selecting module 306 may exclude the SSDs currently unavailable due to background operation (e.g., garbage collection), maintenance, or replacement. Those currently unavailable SSDs may be eliminated prior to or subsequent to the selection of SSDs from the SSDs 150.

Continue the above example for the first scenario, in response to the determined type of physical storage devices being SSD, the device selecting module 306 may select the three SSD and receive the available storage capacity on each SSD from the storage resource monitor 312 as follow: (Device SSD1: 60%, Device SSD2: 40%, Device SSD3: 15%). The device selecting module 306 may also receive the amount of writes for each SSD from the storage resource monitor 312 as follow (Device SSD1: 15 TB/45 TB (i.e., 33%), Device SSD2: 5.5 TB/10 TB (i.e., 55%), Device SSD3: 9 TB/12 TB (i.e., 75%)). In some embodiments, the device selecting module 306 may select top two SSDs that have the largest amount of available storage capacity. Accordingly, the device selecting module 306 may select Device SSD1 and Device SSD2. In other embodiments, the device selecting module 306 may select the SSDs that have the amount of writes lower than 50%. Accordingly, the device selecting module 306 may select Device SSD1. In some embodiments, the device selecting module 306 may select top two SSDs that have the highest ratio between the available storage capacity and the amount of writes. In this example, the ratio between the available storage capacity and the amount of writes is computed for each SSD as follow (Device SSD1: (60%)/(33%)), Device SSD2: (40%)/(55%)), Device SSD3: (15%)/(75%)). Accordingly, the device selecting module 306 may select Device SSD1 and Device SSD2. In this example, assuming that the data describing available resources received from the storage resource monitor 312 indicates that Device SSD2 is currently running background tasks. The device selecting module 306 may then remove the Device SSD2 from the selected SSDs and return (Device SSD1) as the first physical storage device for executing the host command.

In some embodiments, the device selecting module 306 may send the plurality of first physical storage device(s) selected from the set of physical storage devices of the device unit to the device command module 308 for execution of the host command on the selected physical storage device(s).

The device command module 308 may include software and/or logic to provide the functionality for generating and executing device command(s) on physical storage device(s) of the device unit. In some embodiments, the device commands are commands generated and executed within the device unit in order to process a host command received from the host device.

In some embodiments, if the host command includes a read operation or a delete operation of a data item, the device command module 308 may receive the mapping entries including the logical address of the data item from the unified indirection module 310. The device command module 308 may then determine a plurality of first physical storage devices that store the data item based on the mapping entries, and generate a plurality of device commands for these determined physical storage devices based on the host command and the mapping entries. If the host command includes a write operation of a data item, the device command module 308 may receive a plurality of first physical storage devices from the device selecting module 306, and optionally receive the data describing available resources of these selected physical storage devices from the storage resource monitor 312. The device command module 308 may then generate the plurality of device commands for the plurality of first physical storage devices based on the host command and optionally based on their available resources.

In some embodiments, the host command may require a read operation. For example, the execution of a host read command may include reading a data item at a logical address indicated in the host read command. In another example, the execution of a host copy command (or a host move command) may include reading a data item to be copied (or moved) at a source logical address indicated in the host command. In this situation, the device command module 308 may request and receive the mapping entries in the unified indirection table that include the logical address in the host command from the unified indirection module 310. The device command module 308 may extract a plurality of first physical storage devices on which the data blocks of the data item are stored and the physical addresses of these data blocks from the mapping entries. In some embodiments, the device command module 308 may generate a plurality of device read commands for reading these data blocks at the physical addresses on the plurality of first physical storage devices. The device command module 308 may then execute the plurality of device read commands on the plurality of first physical storage devices.

As an example, assuming that the host command to be executed is a host read command for reading the data item at the logical address of 33,087. In the example described above, the data item associated with the logical address of 33,087 is the 8 MB video file partitioned into three data blocks and stored at three different locations on three HDDs. The device selecting module 306 may receive three mapping entries related to the logical address of 33,087 from the unified indirection module 310. The device selecting module 306 may analyze these mapping entries and determine that three data blocks of 3 MB, 2 MB, and 3 MB of the video file are respectively stored at physical address 1 of (Cylinder 1-Head 2-Sector 2) on Device 1, physical address 2 of (Cylinder 3-Head 14-Sector 1) on Device 6, and physical address 3 of (Cylinder 1-Head 2-Sector 63) on Device 9. The device command module 308 may therefore generate three device read commands based on the mapping entries. In particular, the device command module 308 may generate a first device read command to read the first data block of 3 MB starting at the sector (Cylinder 1-Head 2-Sector 2) of Device 1, a second device read command to read the second data block of 2 MB starting at the sector (Cylinder 3-Head 14-Sector 1) of Device 6, and a third device read command to read the third data block of 3 MB starting at the sector (Cylinder 1-Head 2-Sector 63) of Device 9. The device command module 308 may execute the first device read command, the second device read command, and the third device read command on Device 1, Device 6, and Device 9, respectively. As a result of the device read command execution, the device command module 308 may receive these three data blocks from the corresponding physical storage devices. The device command module 308 may aggregate these three data blocks into the data item (e.g., the 8 MB video file in this example) and send the data item to the controller 302 to provide to the host device.

In some embodiments, the device command module 308 may execute the three device read commands simultaneously. Parallel execution of device commands is particularly advantageous because it multiply increases the data rate for transferring data item with the device unit. In particular, by way of non-limiting example, instead of reading the 8 MB video file via a single data channel of 6 Gbps, the multi-device platform firmware 206 can read three data blocks of that 8 MB video file at the same time via three data channels of 6 Gbps corresponding to Device 1, Device 6, and Device 9. As a result, since he data transfer rate can be increased (e.g., dramatically, e.g., three times, etc.)), the amount of seek operations required can be decreased and the latency for processing the host read command can be reduced.

In some embodiments, the host command may require a delete operation. For example, the execution of a host delete command may include deleting a data item indicated in the host delete command. In another example, the execution of a host move command may include deleting a data item at a source logical address after that data item is written to the destination logical address indicated in the host move command. In this situation, the device command module 308 may request and receive the mapping entries in the unified indirection table that includes the logical address in the host command from the unified indirection module 310. The device command module 308 may extract a plurality of first physical storage devices on which the data blocks of the data item are stored and the physical addresses of these data blocks from the mapping entries. The device command module 308 may generate a plurality of device delete commands for marking storage units (e.g., the sectors on HDDs, the memory cells on SSDs) occupied by the data blocks at these physical addresses as reclaimable. In some embodiments, the existing data in storage units marked as reclaimable on HDDs can be overwritten directly. By contrast, the existing data in storage units marked as reclaimable on SSDs needs to be erased before writing new data to the same storage units. The device command module 308 may then execute the plurality of device delete commands on the plurality of first physical storage devices.

As an example, the device command module 308 may process a host delete command for deleting the 8 MB video file associated with logical address of 33,087. Continuing the above example, the device command module 308 may generate three device delete commands. In particular, the device command module 308 may generate a first device delete command to mark as reclaimable all sectors occupied by the first data block of 3 MB starting at the sector (Cylinder 1-Head 2-Sector 2) of Device 1, a second device delete command to mark as reclaimable all sectors taken up by the second data block of 2 MB starting at the sector (Cylinder 3-Head 14-Sector 1) of Device 6, and a third device delete command to mark as reclaimable all sectors occupied by the third data block of 3 MB starting at the sector (Cylinder 1-Head 2-Sector 63) of Device 9. The device command module 308 may execute the first device delete command, the second device delete command, and the third device delete command on Device 1, Device 6, and Device 9, respectively. The device command module 308 may then send an instruction to the unified direction module 310 for removing the mapping entries associated with the logical address of 33,087 from the unified indirection table of the device unit.

As described elsewhere herein, the host command may include a write operation. In this situation, the device command module 308 may receive from the device selecting module 306 a plurality of first physical storage devices selected to write the data item included in the host command. The device command module 308 may partition the data item into a plurality of data blocks, e.g., based on the plurality of first physical storage devices. In some embodiments, the number of data blocks may be the number of first physical storage devices selected by device selecting module 306 and each data block is assigned to one selected physical storage device. In some embodiments, the device command module 308 may partition the data item into multiple data blocks having the same block size. In other embodiments, the device command module 308 may partition the data item into multiple data blocks having different block sizes depending on the physical storage device to which the data block is written.

In particular, the device command module 308 may receive the data describing the available resources of the selected physical storage devices from the storage resource monitor 312, and partition the data item into multiple data blocks based on the available resources. In some embodiments, the size of the data block may be directly proportional to the available storage capacity or the speed (e.g., transfer rate) of the data channel corresponding to the physical storage device on which it is stored. If the selected physical storage devices are SSDs, the size of the data block may be inversely proportional to the amount of writes corresponding to the SSD on which it is stored. The device command module 308 may generate a plurality of device write commands for writing those data blocks to the selected physical storage devices, e.g., the plurality of first physical storage devices. The device command module 308 may then execute the plurality of device write commands on the plurality of first physical storage devices.

As an example, assuming that the host command to be processed is a host write command for writing a movie file of 1.2 GB to the device unit. Continuing the above example, assuming that the device selecting module 306 selects three HDDs (Device HDD2, Device HDD3, Device HDD5) from eight physical storage devices of the device unit for writing the movie file. In some embodiments, the device command module 308 may partition the data item into three data blocks of the same size. Accordingly, the device command module 308 may partition the data item into three data blocks of 400 MB and assign each data block to one selected HDD. In these embodiments, the device command module 308 may not need to request the data describing available resources of the selected HDDs from the storage resource monitor 312.

Continuing this example, in other embodiments, the device command module 308 may receive the available storage capacity of Device HDD2, Device HDD3, and Device HDD5 from the storage resource monitor 312 as follow (Device HDD2: 3.5 TB, Device HDD3: 1.3 TB, Device HDD5: 1.5 GB). The device command module 308 may divide the data item into three data blocks having different sizes directly proportional to the available storage capacity of Device HDD2, Device HDD3, and Device HDD5. Accordingly, the device command module 308 may partition the data item into a first data block of 667 MB assigned to Device HDD2, a second data block of 248 MB assigned to Device HDD3, and a third data block of 285 MB assigned to Device HDD5. The device command module 308 may then generate a first device write command to write the first data block of 667 MB to Device HDD2, a second device write command to write the second data block of 248 MB to Device HDD3, and a third device write command to write the third data block of 285 MB to Device HDD5. The device command module 308 may execute the first device write command, the second device write command, and the third device write command on Device HDD2, Device HDD3, and Device HDD5, respectively.

As a result of the device write command execution, the device command module 308 may receive from Device HDD2, Device HDD3, and Device HDD5 the physical addresses at which the corresponding data blocks are stored. In some embodiments, a data block may be stored at multiple physical addresses on a particular physical storage device. For example, Device HDD2 may store the first data block of 667 MB at three different locations. In this situation, Device HDD2 may provide the physical addresses of all three locations associated with that first data block to the device command module 308. The device command module 308 may send the physical addresses of the data blocks to the unified indirection module 310 to update the unified indirection table of the device unit.

In some embodiments, the device command module 308 may execute the three device write commands simultaneously. As described elsewhere herein, parallel execution of device commands can advantageously increase the data rate for writing a data item to the device unit, reduce the amount of seeks operations needed (if the data item is written to HDDs), and thus reduce the latency in processing the host command. Furthermore, as discussed above, the data blocks are advantageously generated and assigned to the selected physical storage devices based on the resources available on each selected physical storage device of the device unit (e.g., the available storage capacity, the amount of writes, the transfer rate of corresponding data channel, the current availability due to background tasks, etc.). As a result, the device unit described herein has the ability to balance its resources over the workloads and over its physical storage devices. This implementation is particularly advantageous because it reduces the likelihood of corner case scenarios, avoids overexploitation of particular physical storage devices in the device unit (thus, extending their lifetime), and reduces the margin required for the device unit to deal with exceptional workloads in extreme situations.

In some embodiments, the device command module 308 may send a data item read from the physical storage devices of the device unit to the controller 302 to provide to the host device. In these embodiments, the device command module 308 may also send a signal to the host command manager 304 to indicate that the execution of the host read command is complete and the next host command in the unified host command queue can be executed. In other embodiments, the device command module 308 may send an instruction with a logical address of a data item being moved or deleted to the unified indirection module 310 to remove the mapping entries associated with the logical address from the unified indirection table. In other embodiments, the device command module 308 may send an instruction with a logical address of a data item and the physical addresses at which data blocks of the data item are written to the unified indirection module 310 to update the unified indirection table.

The unified indirection module 310 may include software and/or logic to provide the functionality for managing and providing mapping information. In particular, the unified indirection module 310 may retrieve, generate, remove, or update mapping entries included in the unified indirection table of the device unit.

As described elsewhere herein, the unified indirection table may include mapping entries for the set of physical storage devices of the device unit as a whole. In particular, each mapping entry may map a logical address in the logical address space of the device unit to one or more physical addresses, and the physical addresses may be on different physical storage devices of the device unit or on the same physical storage device. In some embodiments, each logical address may have one mapping entry that includes all physical addresses at which the portions (e.g., data blocks) of the corresponding data item are stored. In other embodiments, each logical address may have multiple mapping entries and each mapping entry may include a physical address of one portion (e.g., a data block) of the corresponding data item. In some embodiments, for each data block of the data item, the mapping entries may include the physical addresses of the data block and its block size. As described elsewhere herein, the unified indirection table may be stored on one or more SSDs of the device unit. Storing the unified indirection table on the SSD(s) is particularly advantageous because it avoids seek operation when accessing the mapping information, allows faster retrieval of the mapping information, enables a unified indirection table of larger size than one stored on HDDs and thus, reduces the latency caused by the indirection memory running low.

In some embodiments, the unified indirection module 310 may receive from the device selecting module 306, the device command module 308, or the optimizing module 314 a request for mapping entries associated with a particular logical address. The unified indirection module 310 may identify all mapping entries associated with the requested logical address in the unified indirection table. The unified indirection module 310 may send the identified mapping entries to the device selecting module 306, the device command module 308, or the optimizing module 314.

In some embodiments, the unified indirection module 310 may receive an instruction to create a new mapping entry from the device command module 308, (e.g., when the device command module 308 executes a host command including a write operation, such as a host write command, a host move command, or a host copy command). In some embodiments, the instructions for creating a new mapping entry may include a logical address of a data item, physical addresses at which data blocks of the data item are stored, and the size of the data blocks. Based on the instruction, the unified indirection module 310 may generate a mapping entry that maps the logical address with the physical addresses. Each physical address corresponding to a data block of the data item may be associated with the size of that data block in the generated mapping entry.

In some embodiments, the unified indirection module 310 may receive from the device command module 308 an instruction to remove existing mapping entries associated with a particular logical address from the unified indirection table (e.g., when the device command module 308 executes a host command including a delete operation, such as a host delete command or a host move command). The unified indirection module 310 may identify all mapping entries associated with that logical address and remove those identified mapping entries from the unified indirection table.

In some embodiments, the unified indirection module 310 may receive from the optimizing module 314 an instruction to update existing mapping entries associated with a particular logical address in the unified indirection table. As an example, the optimizing module 314 may relocate data blocks of a data item among physical storage devices of the device unit. Such relocation may be transparent to the host device and thus, the logical address of the data item needs to remain unchanged. In some embodiments, the optimizing module 314 may send an instruction to update the mapping entries associated with the logical address of the data item to the unified indirection module 310. The instruction for updating the mapping entries may include the logical address of the data item and new physical addresses to which the data blocks of the data item are relocated. The unified indirection module 310 may determine all mapping entries associated with the logical address in the unified indirection table, and update those determined mapping entries to include the new physical addresses. In particular, the unified indirection module 310 may keep the logical address in the determined mapping entries the same and replace the outdated physical addresses with the new physical addresses.

In some embodiments, the unified indirection module 310 may send the requested mapping entries to the device selecting module 306, the device command module 308, or the optimizing module 314. In other embodiments, the unified indirection module 310 may send a signal to the host command manager 304 (e.g., after the mapping entries are generated or removed) to indicate that the execution of the host command is complete and the next host command in the unified host command queue can be executed.

The storage resource monitor 312 may include software and/or logic to provide the functionality for monitoring state of the physical storage devices in the device unit. In particular, the storage resource monitor 312 may determine and monitor the amount of resources currently available on each HDD 140 and SSD 150 of the device unit.

In some embodiments, the resources of a physical storage device may include one or more of the available storage capacity, the amount of writes, the current availability due to background tasks, and the transfer rate of a data channel associated with that physical storage device. Other types of resources are also possible and contemplated. In some embodiments, the storage resource monitor 312 may determine the available storage capacity of a HDD (or SSD) in the device unit by determining the amount of remaining storage capacity that can be used to record new data on the HDD (or SSD). Alternatively, the storage resource monitor 312 may determine the available storage capacity of the HDD (or SSD) by computing the ratio between its remaining storage capacity and its total storage capacity. In some embodiments, the storage resource monitor 312 may determine the amounts of writes of a SSD in the device unit. In particular, the storage resource monitor 312 may determine the total number of bytes actually written on the SSD, taking into account the write amplification caused by garbage collection. The storage resource monitor 312 may then determine the amount of writes for the SSD by computing the ratio between the total number of bytes actually written on the SSD and the Total Byte Written the SSD can tolerate as indicated by its write endurance.

In some embodiments, the storage resource monitor 312 may update the available storage capacity and/or the amount of writes of the related HDDs or SSDs each time a task that changes the stored data is executed. Examples of those tasks may include, but not limited to, an execution of a host command (e.g., a host write command, a host copy command, a host move command, a host delete command), performance of a background process (e.g., garbage collection), etc. In other embodiments, the storage resource monitor 312 may update the available storage capacity and/or the amount of writes associated with each HDD and SSD of the device unit periodically (e.g., every 10 minutes, every hour, every day, etc.).

In some embodiments, the storage resource monitor 312 may also keep track of the current availability of each physical storage device of the device unit. For example, the controller 302 may receive data describing that the Device HDD2 is currently unavailable due to maintenance from the Device HDD2 and data describing that the Device SSD3 is currently unavailable due to background tasks from the Device SSD3. The controller 302 may transmit the data to the storage resource monitor 312 and the storage resource monitor 312 may update the availability of the Device HDD2 and the Device SSD3 accordingly. In other embodiments, the storage resource monitor 312 may retrieve a predefined rule specifying the schedule of background process for the set of physical storage devices from the memory 356. The storage resource monitor 312 may then determine the current availability of the HDDs and SSDs based on the current time and the predefined rule. In some embodiments, the storage resource monitor 312 may also track the data indicating transfer rate of the data channel associated with each HDD or SSD in the device unit. As discussed elsewhere herein, if the data channels of the physical storage devices have different transfer rates, the transfer rate may be used as a factor to select the physical storage devices for execution of the host command and to partition of the data item.

In some embodiments, the storage resource monitor 312 may send the data describing the resources currently available on the requested physical storage devices to the device selecting module 306, the device command module 308, or the optimizing module 314. The data describing the available resources may include one or more of the available storage capacity, the amount of writes, the current availability due to background tasks, the transfer rate of corresponding data channels, etc.

The optimizing module 314 may include software and/or logic to provide the functionality for optimizing the placement of data among physical storage devices of the device unit. In particular, the optimizing module 314 may relocate data blocks of a particular data item among the physical storage devices based on the frequency of access to that data item.

In some embodiments, the optimizing module 314 may receive the frequency of access to a particular logical address from the host command manager 304 or from the memory 356. As discussed elsewhere herein, the frequency of access may be the number of times the logical address has been accessed by the host device during a period of time. The frequency of access to a logical address may indicate the temperature of the data item stored at the logical address relative to other data items stored at other logical addresses of the device unit. In some embodiments, the temperature of the data items may change over time. In general, a data item may be considered hot and valuable when it is first created. The data item may drop in temperature and value when it ages and thus, should be transferred to slower and less expensive physical storage devices (e.g., HDDs). In some situations, the data item may become popular at a particular point in time and thus, should be transferred to faster and more expensive physical storage devices (e.g., SSDs).

In some embodiments, the optimizing module 314 may determine whether the frequency of access associated with the logical address satisfies a first threshold frequency. In particular, the optimizing module 314 may determine whether the frequency of access to the logical address exceeds the first threshold frequency. If the frequency of access to the logical address exceeds the first threshold frequency, the optimizing module 314 may determine whether data blocks of the data item associated with that logical address are stored on HDDs, e.g., based on the corresponding physical addresses. In particular, the optimizing module 314 may request the mapping entries that include the logical address from the unified indirection module 310 and extract the physical addresses associated with the logical address from the mapping entries. The optimizing module 314 may then determine whether these physical addresses are physical addresses on the HDDs. For example, if the physical addresses are in the form of Device ID-Cylinder ID-Head ID-Sector ID, the optimizing module 314 may determine that the physical addresses are HDD physical addresses. In another example, the optimizing module 314 may use the list of physical storage devices of the device unit retrieved from the memory 356 to determine the type of storage media (HDD or SSD) of the physical storage device having the Device ID.

If the frequency of access to the logical address exceeds the first threshold frequency and the data blocks of the data item associated with that logical address are stored on HDDs, the optimizing module 314 may relocate the data blocks of the data item to one or more SSDs. In particular, the optimizing module 314 may receive the available resources associated with each SSD of the device unit from the storage resource monitor 312, and select a plurality of SSDs as destination for moving the data blocks of the data item based on the available resources. The optimizing module 314 may then move the data blocks of the data items from the source HDDs on which the data blocks are currently stored to the destination SSDs selected. For example, the optimizing module 314 may perform read operations to read the data blocks from the source HDDs, perform write operations to write these data blocks to the destination SSDs, and then perform delete operations to delete the data blocks from the source HDDs. The selection of the destination SSDs based on available resources and the performance of read operations, write operations, delete operations are similar to those discussed above with reference to the device selecting module 306 and the device command module 308. Their descriptions therefore are not repeated. In some embodiments, the optimizing module 314 may send an instruction to the unified indirection module 310 to update the mapping entries associated with the logical address with the new physical addresses of the data blocks on the destination SSDs.

In some embodiments, the optimizing module 314 may determine whether the frequency of access associated with the logical address satisfies a second threshold frequency. In particular, the optimizing module 314 may determine whether the frequency of access to the logical address is below the second threshold frequency. If the frequency of access to the logical address is below the second threshold frequency, the optimizing module 314 may determine whether data blocks of the data item associated with that logical address are stored on SSDs, e.g., based on the corresponding physical addresses. In particular, the optimizing module 314 may request the mapping entries that include the logical address from the unified indirection module 310 and extract the physical addresses associated with the logical address from the mapping entries. The optimizing module 314 may then determine whether these physical addresses are physical addresses on the SSDs. For example, if the physical addresses are in the form of Device ID-Cell ID, the optimizing module 314 may determine that the physical addresses are SSD physical addresses. Alternatively, the optimizing module 314 may use the list of physical storage devices of the device unit to determine the type of storage media (HDD or SSD) of the physical storage device having the Device ID.

If the frequency of access to the logical address is below the second threshold frequency and the data blocks of the data item associated with that logical address are stored on SSDs, the optimizing module 314 may relocate the data blocks of the data item to one or more HDDs. In particular, the optimizing module 314 may receive the available resources associated with each HDD of the device unit from the storage resource monitor 312, and select a plurality of HDDs as destination for moving the data blocks of the data item based on the available resources. The optimizing module 314 may then move the data blocks of the data items from the source SSDs on which the data blocks are currently stored to the destination HDDs selected. For example, the optimizing module 314 may perform read operations to read the data blocks from the source SSDs, perform write operations to write these data blocks to the destination HDDs, and then perform delete operations to delete the data blocks from the source SSDs. In some embodiments, the optimizing module 314 may send an instruction to the unified indirection module 310 to update the mapping entries associated with the logical address with the new physical addresses of the data blocks on the destination HDDs.

As described above, the optimizing module 314 may relocate data items frequently accessed by the host device from the HDDs to SSDs and relocate data items infrequently or rarely accessed by the host device from the SSDs to HDDs. By dynamically moving the frequently accessed data to the physical storage devices having higher performance and higher cost (e.g., SSDs), and moving the infrequently or rarely accessed data to the physical storage devices having lower performance and lower cost (e.g., HDDs), the physical storage devices of the device unit can be used efficiently, thereby reducing access latency and storage cost. As discussed above, the optimizing module 314 may automatically relocate data blocks of a data item among the physical storage devices of the device unit without changing its logical address used by the host device to access the data item. Accordingly, such relocation may not affect the operation of the host device.

Figure 4:
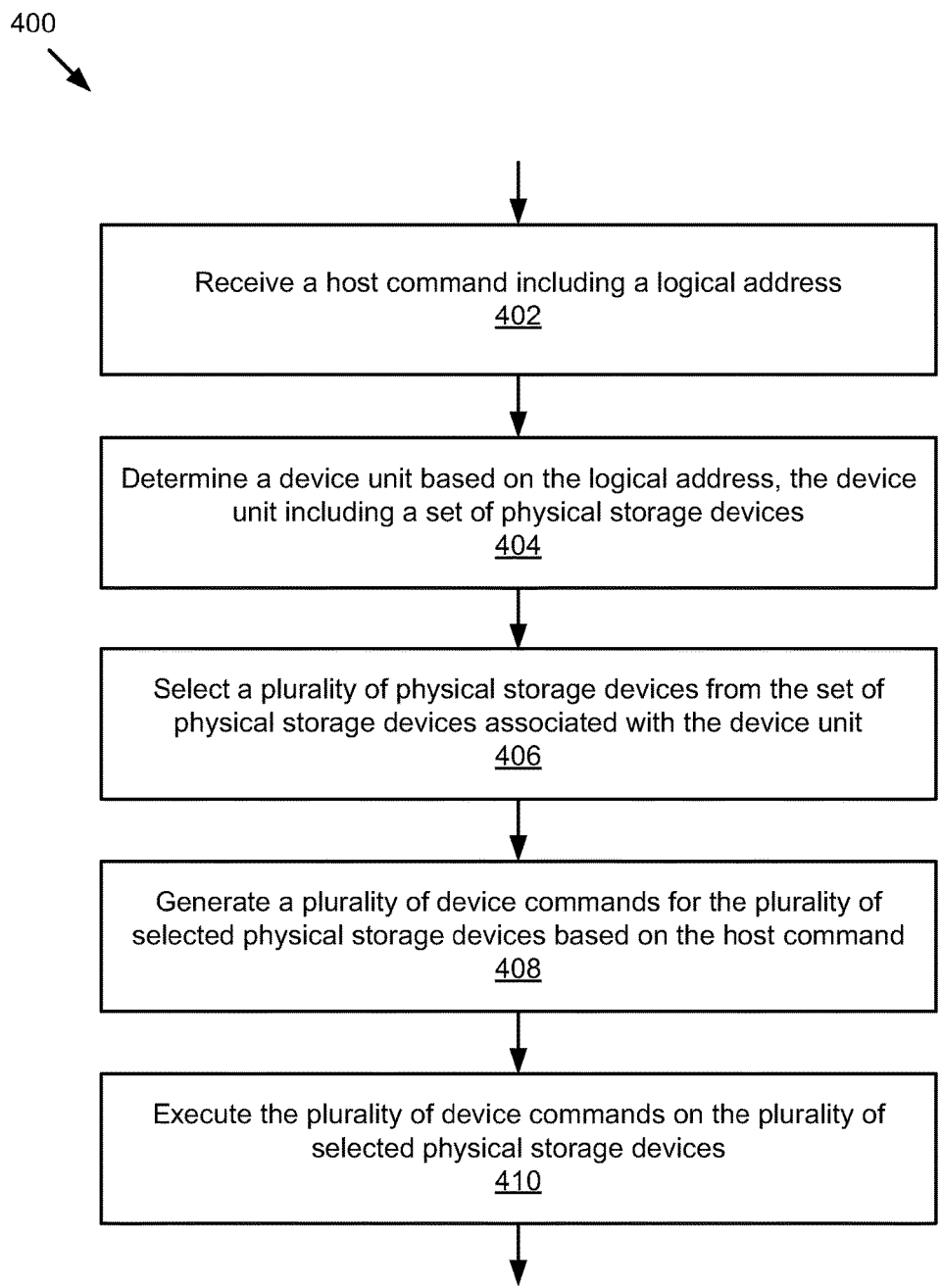
FIG. 4 is a flowchart of an example method for transferring a data item with a device unit.

FIG. 4 is a flow diagram illustrating an example method 400 for transferring a data item with a multi-device platform, e.g., a device unit 130. In block 402, the multi-device storage layer 112 may receive a host command including a logical address from an online application hosted by the server 104. In block 404, the multi-device storage layer 112 may determine a device unit 130 for processing the host command from multiple device units of the system. For example, the multi-device storage layer 112 may determine the device unit having the logical address space that includes the logical address of the host command. As described above, the multi-device storage layer 112 may compare the logical address of the host command to a range of logical addresses corresponding to each device unit as defined in the table of device unit address. In some embodiments, the device unit 130 may have a set of physical storage devices including magnetic storage device(s) (e.g., HDDs) and flash storage device(s) (e.g., SSDs) that are managed by the multi-device platform firmware 206. As described above, the multi-device platform firmware 206 may include the controller 302, the host command manager 304, the device selecting module 306, the device command module 308, the unified indirection module 310, the storage resource monitor 312, and the optimizing module 314.

The method 400 may continue by processing the host command on the selected device unit 130. In block 406, the device selecting module 306 may select a plurality of physical storage devices from the set of physical storage devices of the device unit 130. For example, the device selecting module 306 may determine a type of physical storage device (HDD or SSD) for executing the host command and select a plurality of physical storage devices of the determined type based on their currently available resources. Examples of the available resources may include the available storage capacity, the amount of writes, the transfer rate of corresponding data channel, the current availability due to background tasks, etc. In block 408, the device command module 308 may generate a plurality of device commands for the plurality of selected physical storage devices based on the host command. For example, if the host command is a host write command for writing a data item and three physical storage devices of the device unit are selected, the device command module 308 may partition the data item into three data blocks, and generate three device write commands for writing the three data blocks to the three selected physical storage devices. In some embodiments, the plurality of device commands for the selected physical storage devices may be generated based on the host command and the resources currently available on the selected physical storage devices. For example, the block size of each data block to be partitioned may be proportional to the available storage capacity of the physical storage device to which it is assigned. In block 410, the device command module 308 may execute the plurality of device commands on the plurality of selected physical storage devices.

FIGS. 5A-5H are flowcharts of an example method 500 for processing a host command received from a host device. In block 502, the multi-device storage layer 112 may receive a host command from the host device. The host command may be a host read command for reading a data item stored at a logical address of a device unit, a host write command for writing a data item to a logical address of a device unit, or a host delete command for deleting a data item stored at a logical address of a device unit. The host command may also be a host copy command for writing a copy of a data item which is stored at a source logical address of a source device unit to a destination logical address of a destination device unit. The host command may also be a host move command for moving a data item stored at a source logical address of a source device unit to a destination logical address of a destination device unit. In the host copy command and the host move command, the destination device unit may be the same or different from the source device unit.

The method 500 may continue by determining the type of the host command. In particular, in block 504, the multi-device storage layer 112 may determine whether the host command is a host read command. If the host command is the host read command, the method 500 proceeds to block 520 in FIG. 5B. Otherwise, the method 500 proceeds to block 506. In block 506, the host command manager 304 may determine whether the host command is a host write command. If the host command is the host write command, the method 500 proceeds to block 540 in FIG. 5C. Otherwise, the method 500 proceeds to block 508. In block 508, the host command manager 304 may determine whether the host command is a host copy command. If the host command is the host copy command, the method 500 proceeds to block 560 in FIG. 5D. Otherwise, the method 500 proceeds to block 510. In block 510, the host command manager 304 may determine whether the host command is a host move command. If the host command is the host move command, the method 500 proceeds to block 561 in FIG. 5F. Otherwise, the method 500 proceeds to block 512. In block 512, the host command manager 304 may determine whether the host command is a host delete command. If the host command is the host delete command, the method 500 proceeds to block 590 in FIG. 5H. Otherwise, the method 500 ends.

Figure 5A:
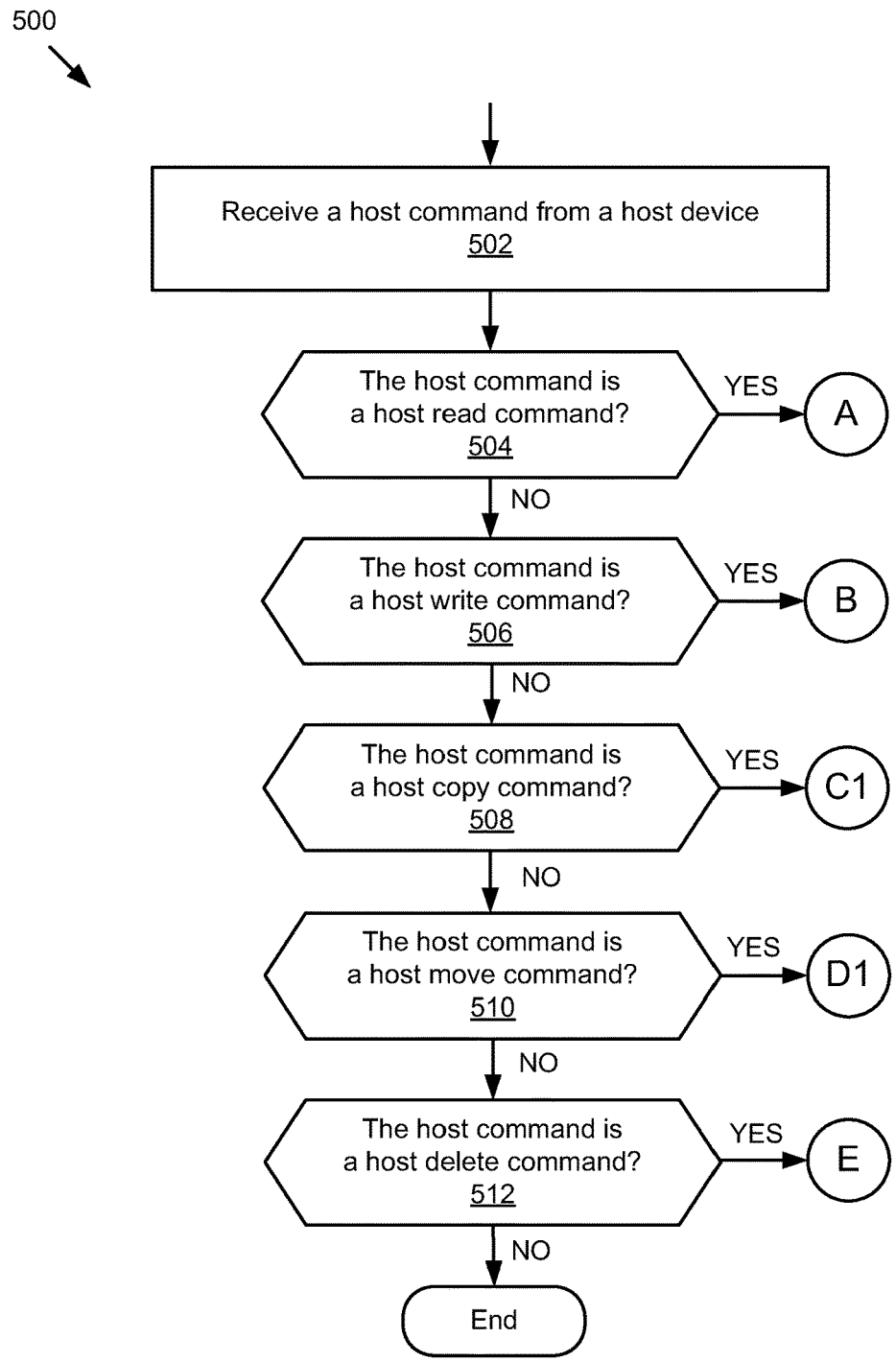
FIG. 5A-5H are flowcharts of an example method for processing a host command received from a host device.
Figure 5B:
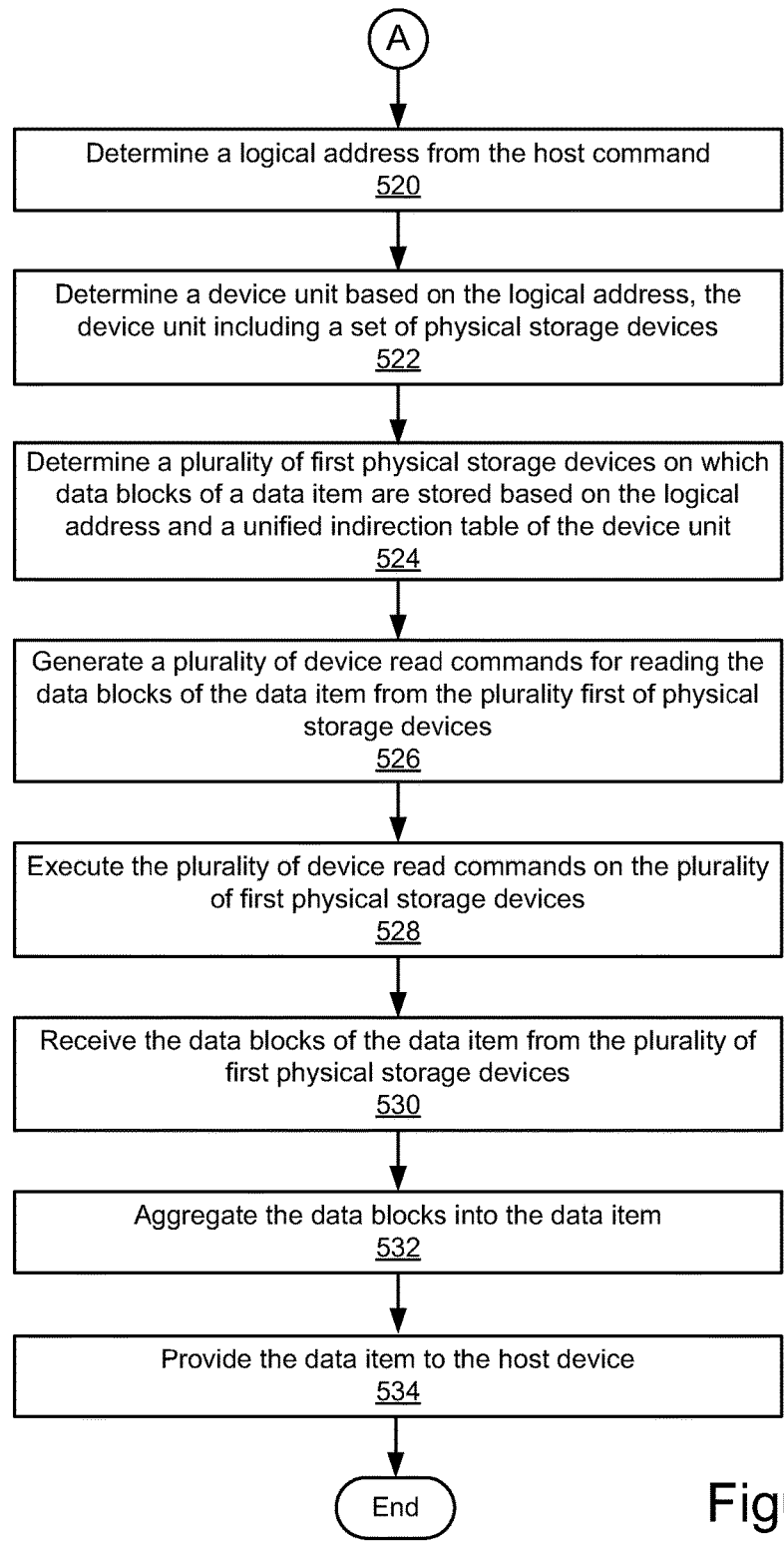

As discussed above, if the host command is a host read command, the method 500 proceeds to block 520 in FIG. 5B. In some embodiments, the host read command may be a host command for reading a data item stored at a logical address indicated in the host read command. In block 520, the multi-device storage layer 112 may determine the logical address from the host command. In block 522, the multi-device storage layer 112 may determine a device unit 130 from the device units of the system based on the logical address. For example, the multi-device storage layer 112 may use the table of device unit address to determine the device unit that has a range of logical addresses including the logical address in the host read command. The multi-device storage layer 112 may then assign the host read command to the determined device unit. In some embodiments, the determined device unit may have a set of physical storage devices with HDD(s) and SSD(s) that are managed by the multi-device platform firmware 206. As described above, the multi-device platform firmware 206 may include the controller 302, the host command manager 304, the device selecting module 306, the device command module 308, the unified indirection module 310, the storage resource monitor 312, and the optimizing module 314.

The method 500 may proceed with the determined device unit processing the host read command. In particular, in block 524, the device command module 308 may determine a plurality of first physical storage devices on which the data blocks of the data item are stored from the set of physical storage devices of the device unit. In some embodiments, the device command module 308 may determine the plurality of first physical storage devices based on the logical address of the data item and the unified indirection table of the device unit. For example, the device command module 308 may request and receive the mapping entries in the unified indirection table that include the logical address in the host read command. The device command module 308 may then analyze the mapping entries to determine the plurality of first physical storage devices on which the data blocks of the data item are stored and the physical addresses of these data blocks. In block 526, the device command module 308 may generate a plurality of device read commands for reading these data blocks at the physical addresses on the plurality of first physical storage devices. In block 528, the device command module 308 may execute the plurality of device read commands on the plurality of first physical storage devices. As a result of the device read command execution, in block 530, the device command module 308 may receive the data blocks of the data item from the corresponding physical storage devices. In block 532, the device command module 308 may aggregate the data blocks into the data item. In block 534, the controller 302 may provide the data item to the host device. The method 500 then ends.

Figure 5C:
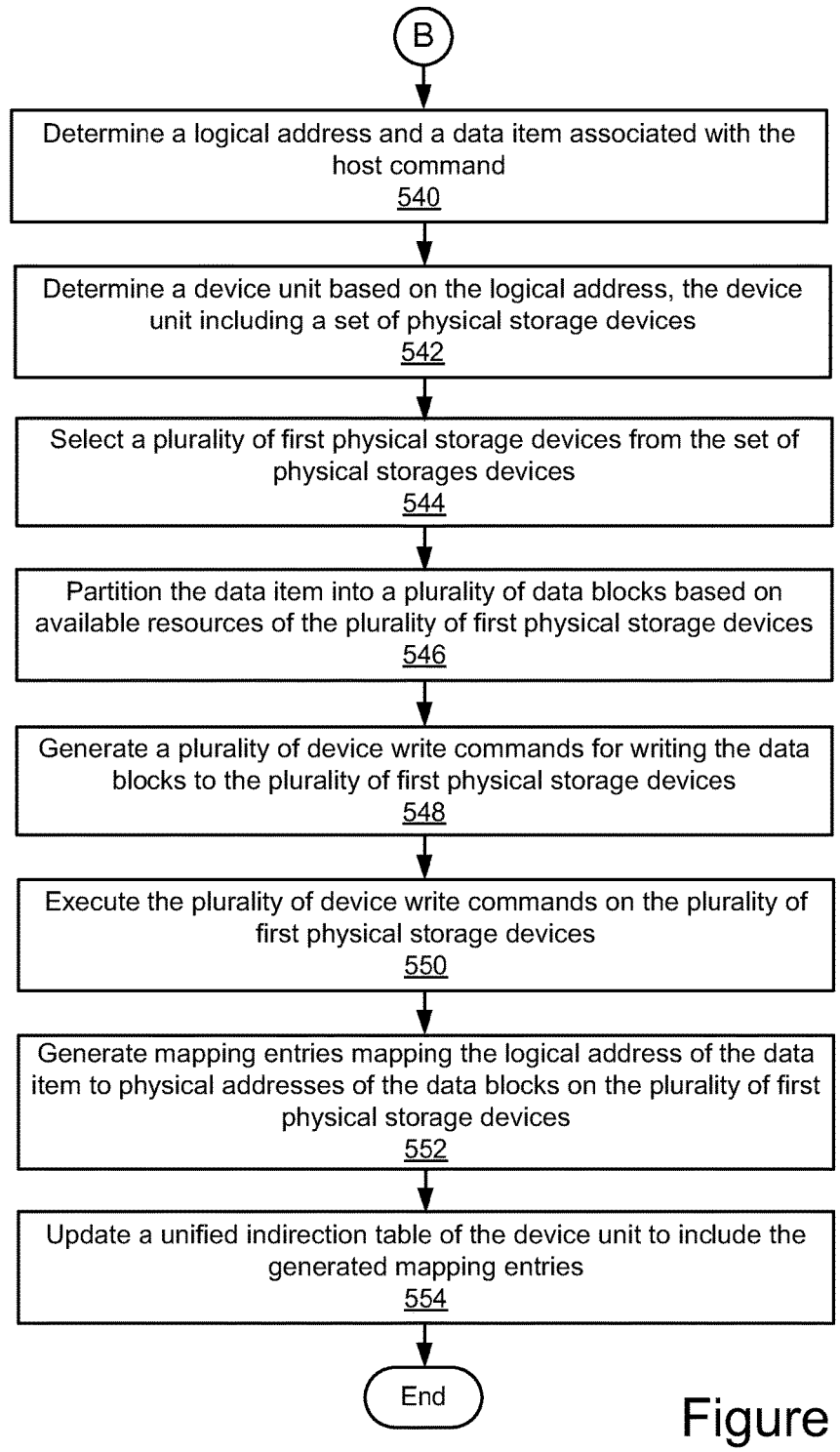

As discussed above, if the host command is a host write command, the method 500 proceeds to block 540 in FIG. 5C. In some embodiments, the host write command may be a host command for writing a data item to a logical address of a device unit. The host write command may include the logical address and the data item to be written. In block 540, the multi-device storage layer 112 may determine the logical address and the data item from the host command. In block 542, the multi-device storage layer 112 may determine a device unit 130 from the device units of the system based on the logical address. For example, the multi-device storage layer 112 may use the table of device unit address to determine the device unit that has a range of logical addresses including the logical address in the host write command. The multi-device storage layer 112 may then assign the host write command to the determined device unit.

The method 500 may proceed with the determined device unit processing the host write command. In particular, in block 544, the device selecting module 306 may select a plurality of first physical storage devices for writing the data item from the set of physical storage devices of the device unit. In some embodiments, the device selecting module 306 may determine the type of the physical storage device (e.g., HDD or SSD) for writing the data item and select candidate physical storage devices of the determined type. For example, the device selecting module 306 may determine the type of physical storage device based on a device type value included in the host write command, a default setting, or a predefined rule which specifies a type of physical storage device for a data type corresponding to the data item. The device selecting module 306 may then identify all physical storage devices of the determined type included in the device unit as candidate physical storage devices. The device selecting module 306 may then select the plurality of first physical storage devices from the candidate physical storage devices based on their currently available resources. The currently available resources may include the available storage capacity, the amount of writes, the transfer rate of corresponding data channel, the current availability due to background tasks, etc. For example, the device selecting module 306 may select the SSDs that have the amount of writes below a threshold value and not currently busy with background operation as the plurality of first physical storage devices.

The method 500 may then proceed to block 546. In block 546, the device command module 308 may partition the data item to be written into a plurality of data blocks, e.g., based on the plurality of first physical storage devices. In particular, the number of the data blocks may be determined based on the number of first physical storage devices, and the block size of each data block may be determined based on the available resource of the physical storage device to which the data block is written. For example, the number of the data blocks may be the number of the first physical storage devices selected by the device selecting module 306 and each data block may be assigned to a selected physical storage device. The block size of the each data block may be directly proportional to the available storage capacity of the corresponding physical storage device (e.g., HDD or SSD) to which it is assigned. In another example, the block size of the each data block may be inversely proportional to the amount of writes associated with the corresponding physical storage device (e.g., SSD) to which it is assigned. In block 548, the device command module 308 may generate a plurality of device write commands, each device write command is for writing a data block to its corresponding physical storage device in the plurality of first physical storage devices. In block 550, the device command module 308 may execute the plurality of device write commands on the plurality of first physical storage devices. As a result of the device write command execution, the device command module 308 may receive the physical addresses at which the data blocks are written on the plurality of first physical storage devices. In block 552, the unified indirection module 310 may generate new mapping entries that map the logical address of the data item to these physical addresses. In some embodiments, for each data block of the data item, the mapping entries may include the physical address and the block size of that data block. In block 554, the unified indirection module 310 may update the unified indirection table of the device unit to include the generated mapping entries. The method 500 then ends.

Figure 5D:
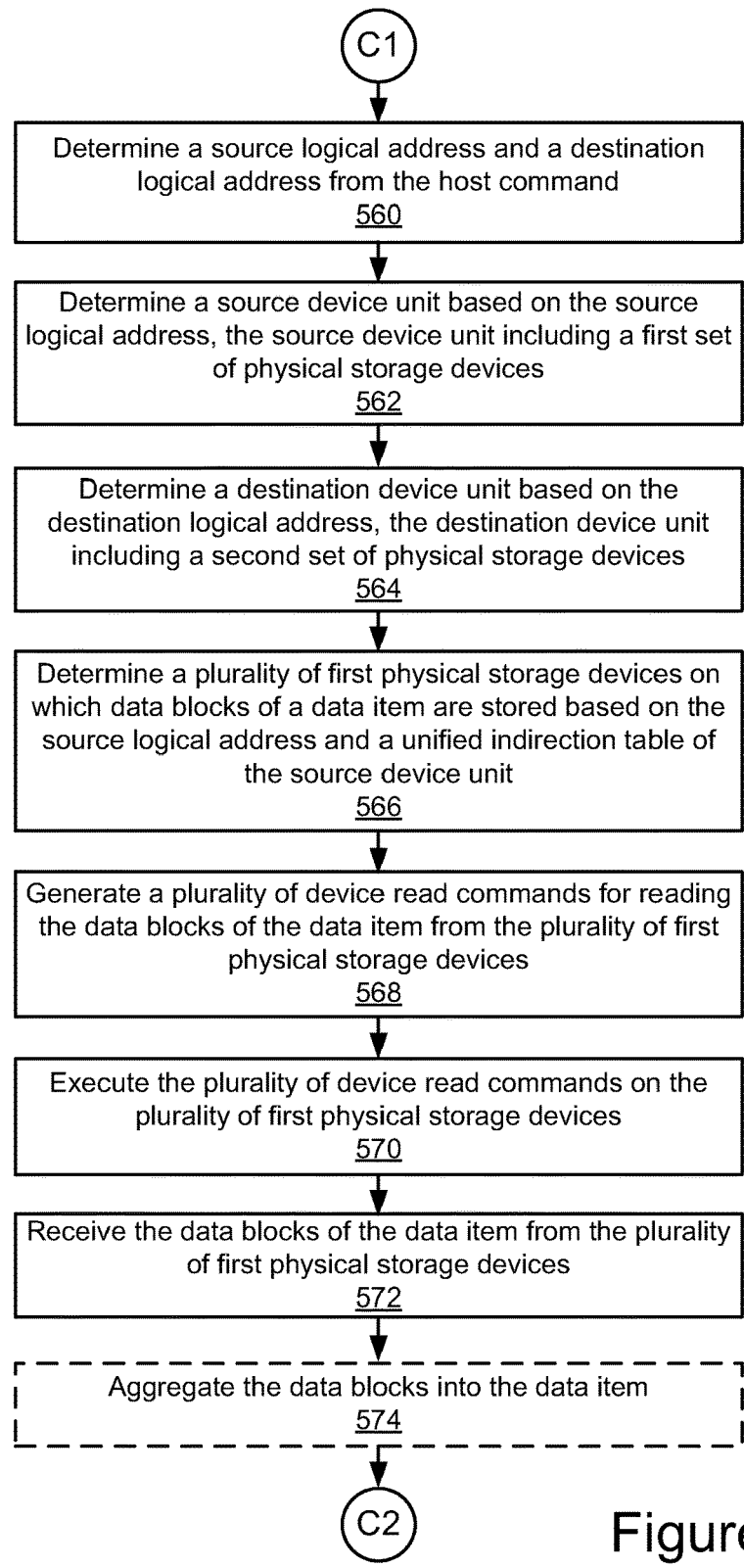
Figure 5E:
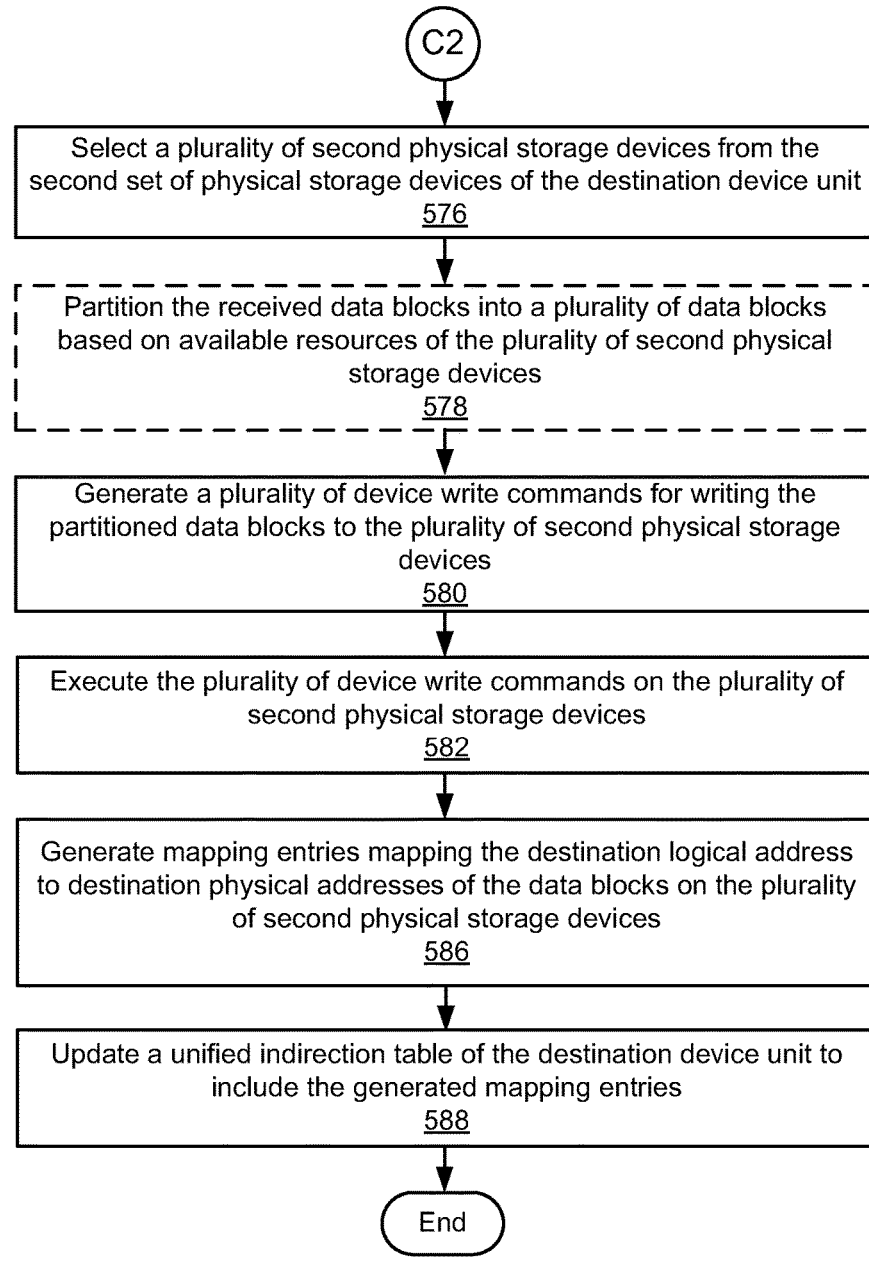

As discussed above, if the host command is a host copy command, the method 500 proceeds to block 560 in FIG. 5D. In some embodiments, the host copy command may be a host command for writing a copy of a data item stored at a source logical address on a source device unit to a destination logical address on a destination device unit. The destination device unit may be the same or may be different from the source device unit. The host copy command may include the source logical address and the destination logical address. In block 560, the multi-device storage layer 112 may determine the source logical address and the destination logical address from the host command. In block 562, the multi-device storage layer 112 may determine the source device unit from the device units of the system based on the source logical address. In block 564, the multi-device storage layer 112 may determine the destination device unit from the device units of the system based on the destination logical address. For example, the multi-device storage layer 112 may use the table of device unit address to identify the device unit that has a range of logical addresses including the source logical address as the source device unit. The source device unit may have a first set of physical storage devices including HDD(s) and SSD(s). The multi-device storage layer 112 may use the table of device unit address to identify the device unit that has a range of logical addresses including the destination logical address as the destination device unit. The destination device unit may have a second set of physical storage devices including HDD(s) and SSD(s). The multi-device storage layer 112 may then send the host copy command to the source device unit.

The method 500 may proceed with the source device unit performing the read operation of the host copy command. In particular, in block 566, the device command module 308 (e.g., of the source device unit) may determine a plurality of first physical storage devices on which data blocks of the data item are stored using the source logical address. For example, the device command module 308 may request and receive the mapping entries in the unified indirection table of the source device unit that include the source logical address. The device command module 308 may then analyze the mapping entries to determine the plurality of first physical storage devices on which the data blocks of the data item are stored and the source physical addresses of these data blocks. In block 568, the device command module 308 may generate a plurality of device read commands for reading these data blocks at the source physical addresses on the plurality of first physical storage devices. In block 570, the device command module 308 may execute the plurality of device read commands on the plurality of first physical storage devices. As a result of the device read command execution, in block 572, the device command module 308 may receive the data blocks of the data item from the corresponding physical storage devices. In block 574, the device command module 308 may aggregate the data blocks into the data item. It should be understood that the aggregation of the data blocks is optional in some embodiments, therefore the block 574 is shown with dashed lines in FIG. 5D. In some embodiments, the controller 302 (e.g., of the source device unit) may send the host copy command together with the data blocks (or the aggregated data item) to the destination device unit.

The method 500 may proceed with the destination device unit performing the write operation of the host copy command. For example, the controller 302 (e.g., of the destination device unit) may receive the host copy command together with the result of the read operation on the source device unit (e.g., the data blocks or the aggregated data item) from the source device unit. In block 576, the device selecting module 306 (e.g., of the destination device unit) may select a plurality of second physical storage devices from the second set of physical storage devices in the destination device unit for writing the data blocks (or the aggregated data item). In some embodiments, the device selecting module 306 may determine the type of the physical storage device (e.g., HDD or SSD) for writing the data blocks (or the aggregated data item) and select candidate physical storage devices of the determined type. For example, the device selecting module 306 may determine the type of physical storage device based on a default setting or a predefined rule specifying a type of physical storage device for a data type corresponding to the data item. The device selecting module 306 may then identify all physical storage devices of the determined type in the second set of physical storage devices as candidate physical storage devices. The device selecting module 306 may then select a plurality of second physical storage devices from the candidate physical storage devices based on the resources currently available on the plurality of second physical storage devices.

The method 500 may then proceed to block 578. In block 578, the device command module 308 (e.g., of the destination device unit) may partition the data blocks or the aggregated data item received from the source device unit into a plurality of data blocks. In some embodiments, the data blocks received from the source device unit may be written to the destination device unit without being re-partitioned. In other embodiments, the data blocks received from the source device unit may be re-partitioned based on the available resources of the plurality of second physical storage devices selected to write these data blocks. Accordingly, the block 578 is optional and thus, shown with dashed lines in FIG. 5E. In some embodiments, the available resource of the plurality of second physical storage devices may be used to determine the number of the re-partitioned data blocks and the block size of each re-partitioned data block. Examples of the available resources may include the available storage capacity, the amount of writes, the transfer rate of corresponding data channel, the current availability due to background tasks, etc.

The method 500 may then proceed to block 580. In block 580, the device command module 308 (e.g., of the destination device unit) may generate a plurality of device write commands, each device write command is for writing a data block (e.g., a repartitioned data block or a data block received from the source device unit) to its corresponding physical storage device in the plurality of second physical storage devices. In block 582, the device command module 308 may execute the plurality of device write commands on the plurality of second physical storage devices. As a result of the device write command execution, the device command module 308 may receive the destination physical addresses at which the data blocks are written on the plurality of second physical storage devices. In block 586, the unified indirection module 310 (e.g., of the destination device unit) may generate new mapping entries that map the destination logical address of the data item to the destination physical addresses. In some embodiments, for each data block of the data item, the mapping entries may include the destination physical address and the block size of that data block. In block 588, the unified indirection module 310 may update the unified indirection table of the destination device unit to include the generated mapping entries. The method 500 then ends.

Figure 5F:
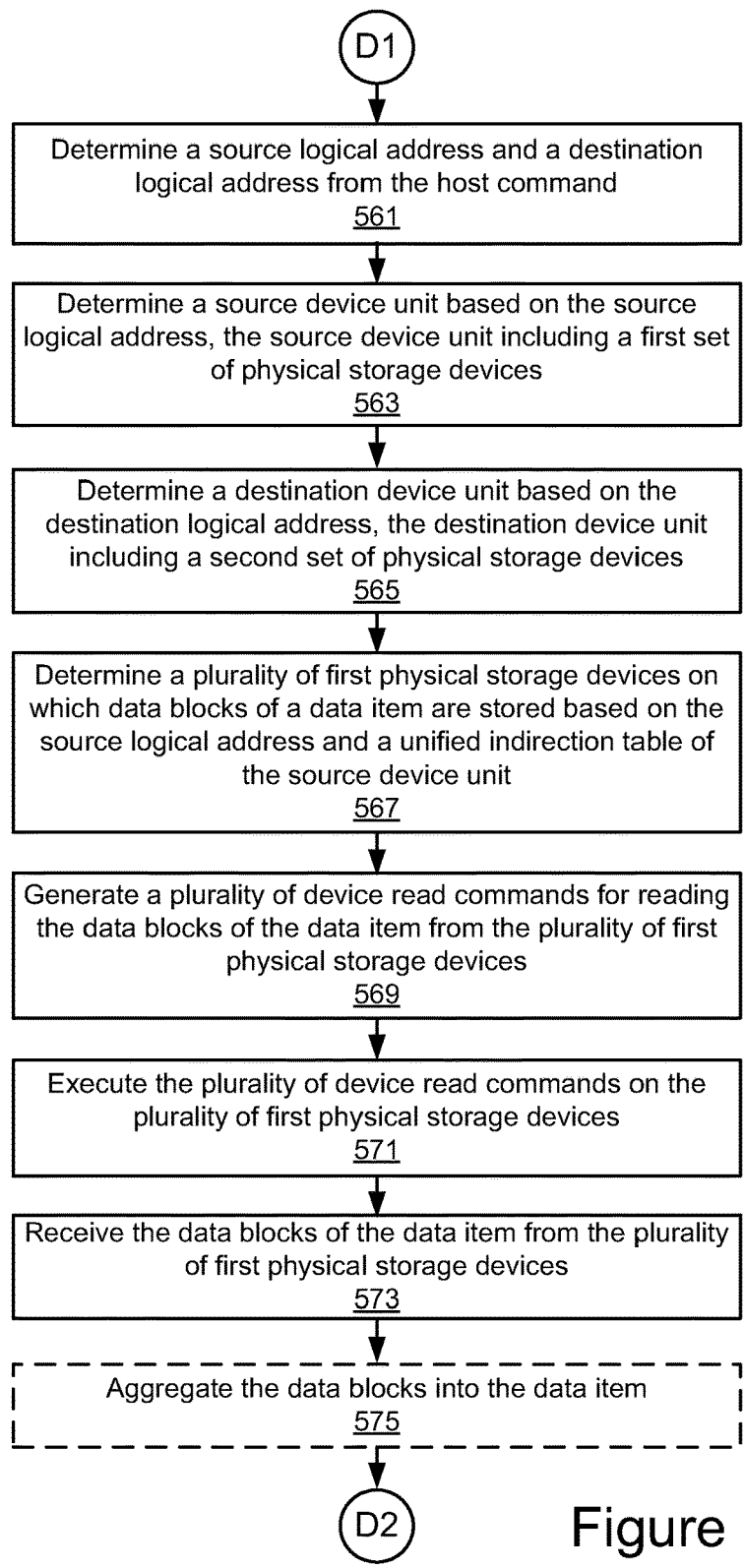
Figure 5G:
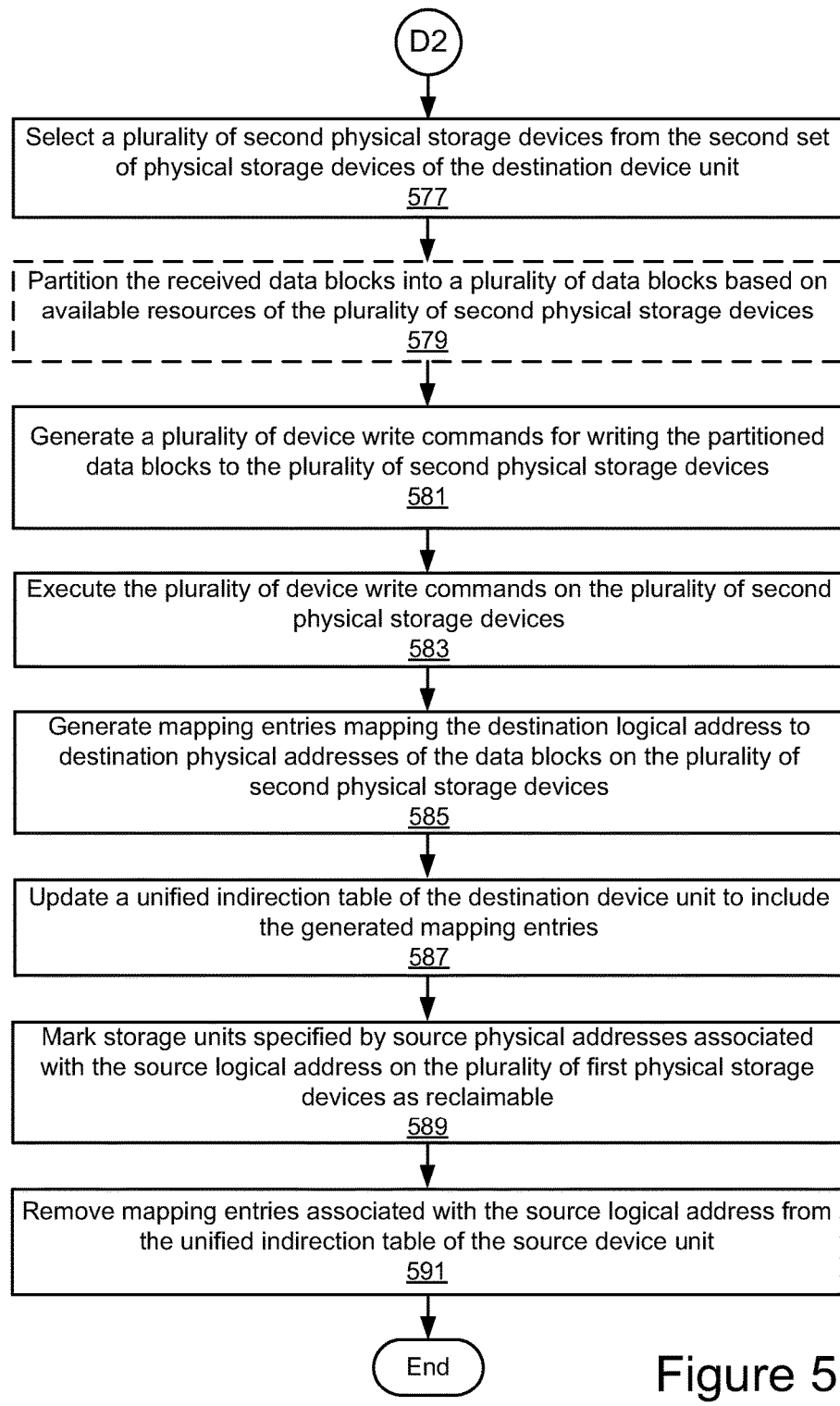

As discussed above, if the host command is a host move command, the method 500 proceeds to block 561 in FIG. 5F. In some embodiments, the host move command may be a host command for moving a data item stored at a source logical address on a source device unit to a destination logical address on a destination device unit. The destination device unit may be the same or may be different from the source device unit. The host move command may include the source logical address and the destination logical address. In block 561, the multi-device storage layer 112 may determine the source logical address and the destination logical address from the host command. In block 563, the multi-device storage layer 112 may determine the source device unit from the device units of the system based on the source logical address. In block 565, the multi-device storage layer 112 may determine the destination device unit from the device units of the system based on the destination logical address. For example, the multi-device storage layer 112 may use the table of device unit address to identify the device unit that has a range of logical addresses including the source logical address in the host move command as the source device unit. The source device unit may have a first set of physical storage devices including HDD(s) and SSD(s). The multi-device storage layer 112 may use the table of device unit address to identify the device unit that has a range of logical addresses including the destination logical address as the destination device unit. The destination device unit may have a second set of physical storage devices including HDD(s) and SSD(s). The multi-device storage layer 112 may then send the host move command to the source device unit.

The method 500 may proceed with the source device unit performing the read operation of the host move command. In particular, in block 567, the device command module 308 (e.g., of the source device unit) may determine a plurality of first physical storage devices on which data blocks of the data item are stored using the source logical address. For example, the device command module 308 may request and receive the mapping entries in the unified indirection table of the source device unit that include the source logical address. The device command module 308 may then analyze the mapping entries to determine the plurality of first physical storage devices on which the data blocks of the data item are stored and the source physical addresses of these data blocks. In block 569, the device command module 308 may generate a plurality of device read commands for reading these data blocks at the source physical addresses on the plurality of first physical storage devices. In block 571, the device command module 308 may execute the plurality of device read commands on the plurality of first physical storage devices. As a result of the device read command execution, in block 573, the device command module 308 may receive the data blocks of the data item from the corresponding physical storage devices. In block 575, the device command module 308 may aggregate the data blocks into the data item. It should be understood that the aggregation of the data blocks may be optional in some embodiments, therefore the block 575 is shown with dashed lines in FIG. 5F. In some embodiments, the controller 302 (e.g., of the source device unit) may send the host move command together with the data blocks (or the aggregated data item) to the destination device unit.

The method 500 may proceed with the destination device unit performing the write operation of the host move command. For example, the controller 302 (e.g., of the destination device unit) may receive the host move command together with the result of the read operation on the source device unit (e.g., the data blocks or the aggregated data item) from the source device unit. In block 577, the device selecting module 306 (e.g., of the destination device unit) may select a plurality of second physical storage devices from the second set of physical storage devices in the destination device unit for writing the data blocks (or the aggregated data item). In some embodiments, the device selecting module 306 may determine the type of the physical storage device (e.g., HDD or SSD) for writing the data blocks (or the aggregated data item) and select candidate physical storage devices of the determined type. For example, the device selecting module 306 may determine the type of physical storage device based on a default setting or a predefined rule that specifies a type of physical storage device for a data type corresponding to the data item. The device selecting module 306 may then identify all physical storage devices of the determined type in the second set of physical storage devices as candidate physical storage devices. The device selecting module 306 may then select the plurality of second physical storage devices from the candidate physical storage devices based on the resources currently available on the plurality of second physical storage devices.

The method 500 may then proceed to block 579. In block 579, the device command module 308 (e.g., of the destination device unit) may partition the data blocks (or the aggregated data item) received from the source device unit into a plurality of data blocks. In some embodiments, the data blocks received from the source device unit may be written to the destination device unit without being re-partitioned. In other embodiments, the data blocks received from the source device unit may be re-partitioned based on the available resources of the plurality of second physical storage devices selected to write these data blocks. Accordingly, the block 579 is optional and thus, shown with dashed lines in FIG. 5E. As described elsewhere herein, the available resource of the plurality of second physical storage devices may be used to determine the number of the re-partitioned data blocks and the block size of each re-partitioned data block. Examples of the available resources may include the available storage capacity, the amount of writes, the transfer rate of corresponding data channel, the current availability due to background tasks, etc.

The method 500 may then proceed to block 581. In block 581, the device command module 308 (e.g., of the destination device unit) may generate a plurality of device write commands, each device write command is for writing a data block (e.g., a repartitioned data block or a data block received from the source device unit) to its corresponding physical storage device in the plurality of second physical storage devices. In block 583, the device command module 308 may execute the plurality of device write commands on the plurality of second physical storage devices. As a result of the device write command execution, the device command module 308 may receive the destination physical addresses at which the data blocks are written on the plurality of second physical storage devices. In block 585, the unified indirection module 310 (e.g., of the destination device unit) may generate new mapping entries that map the destination logical address of the data item to these destination physical addresses. In some embodiments, for each data block of the data item, the mapping entries may include the destination physical address and the block size of that data block. In block 587, the unified indirection module 310 may update the unified indirection table of the destination device unit to include the generated mapping entries. The controller 302 of the destination device unit may then send an instruction for deleting the data item associated with the source logical address to the controller 302 of the source device unit.

The method 500 may then proceed to block 589. In block 589, responsive to receiving the instruction for deleting the data item associated with the source logical address, the device command module 308 (e.g., of the source device unit) may mark storage units specified by the source physical addresses on the source device unit as reclaimable. For example, the device command module 308 may generate a plurality of device delete commands for marking the storage units (e.g., sectors on HDDs, memory cells on SSDs) occupied by the data blocks and localized by the source physical addresses on the source device unit as reclaimable. The device command module 308 may then execute the plurality of device delete commands on the plurality of first physical storage device of the source device unit. In block 591, the unified indirection module 310 (e.g., of the source device unit) may remove the mapping entries associated with the source logical address from the unified indirection table of the source device unit. The method 500 then ends.

Figure 5H:
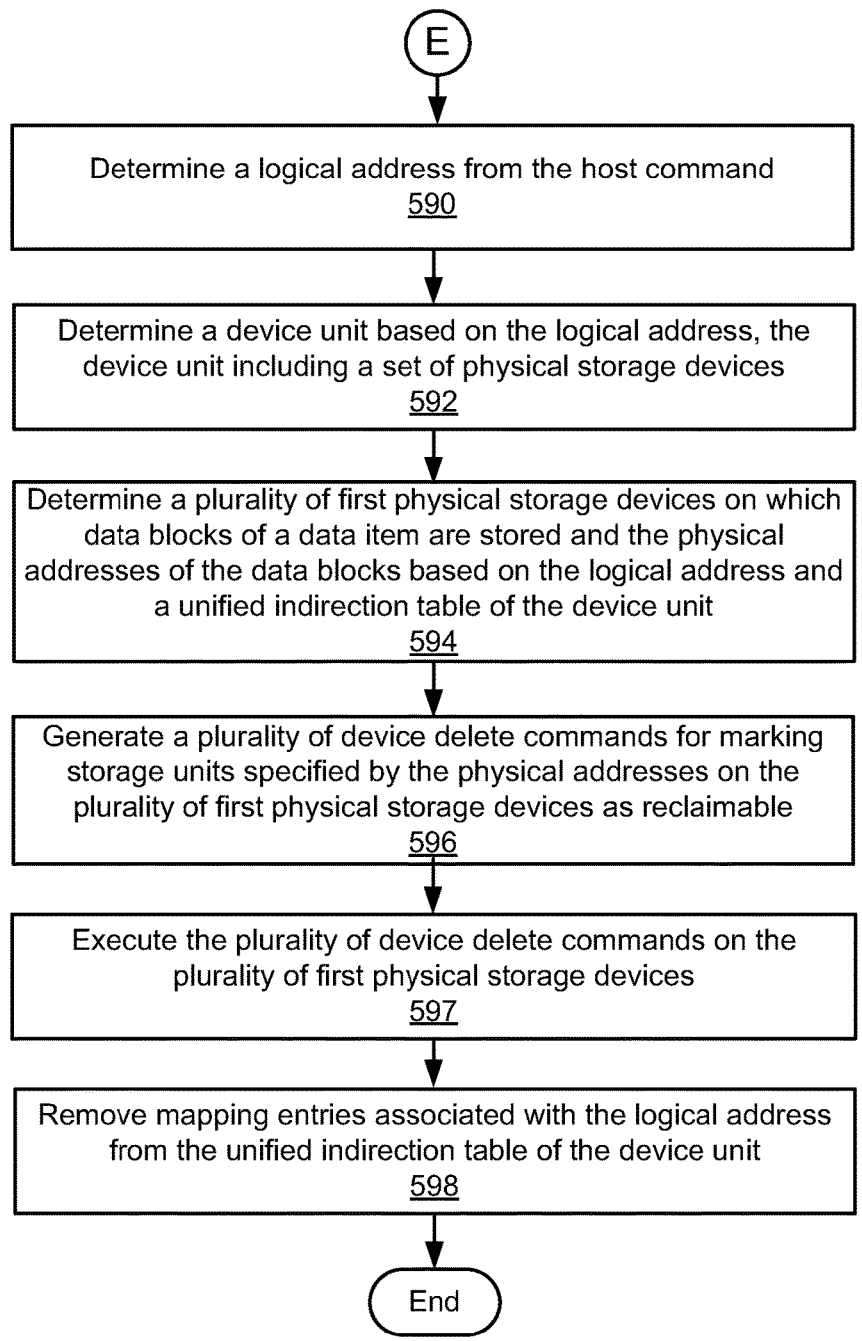

As discussed above, if the host command is a host delete command, the method 500 proceeds to block 590 in FIG. 5H. In some embodiments, the host delete command may be a host command for deleting a data item stored at a logical address indicated in the host delete command. In block 590, the multi-device storage layer 112 may determine the logical address from the host command. In block 592, the multi-device storage layer 112 may determine a device unit 130 from the device units of the system based on the logical address. For example, the multi-device storage layer 112 may use the table of device unit address to determine the device unit that has a range of logical addresses including the logical address in the host delete command. The multi-device storage layer 112 may then assign the host delete command to the determined device unit.

The method 500 may proceed with the determined device unit processing the host delete command. In particular, in block 594, the device command module 308 may determine a plurality of first physical storage devices on which the data blocks of the data item are stored, and the physical addresses of these data blocks on the plurality of first physical storage devices. In some embodiments, the device command module 308 may determine the plurality of first physical storage devices and the physical addresses based on the logical address of the data item and the unified indirection table of the device unit. For example, the device command module 308 may request and receive the mapping entries in the unified indirection table that include the logical address in the host delete command. The device command module 308 may then analyze the mapping entries to determine the plurality of first physical storage devices on which the data blocks of the data item are stored and the physical addresses of these data blocks. In block 596, the device command module 308 may generate a plurality of device delete commands for marking the storage units (e.g., the sectors or the memory cells) localized by the physical addresses on the plurality of first physical storage devices as reclaimable. In block 597, the device command module 308 may execute the plurality of device delete commands on the plurality of first physical storage devices. As a result of the device delete command execution, these storage units may be reclaimed (e.g., at a later point in time) for storing new data, e.g., by erasing the existing data or by directly overwrite the new data to the storage units. In block 598, the unified indirection module 310 may remove the mapping entries associated with the logical address from the unified indirection table of the device unit. The method 500 then ends.

Figure 6A:
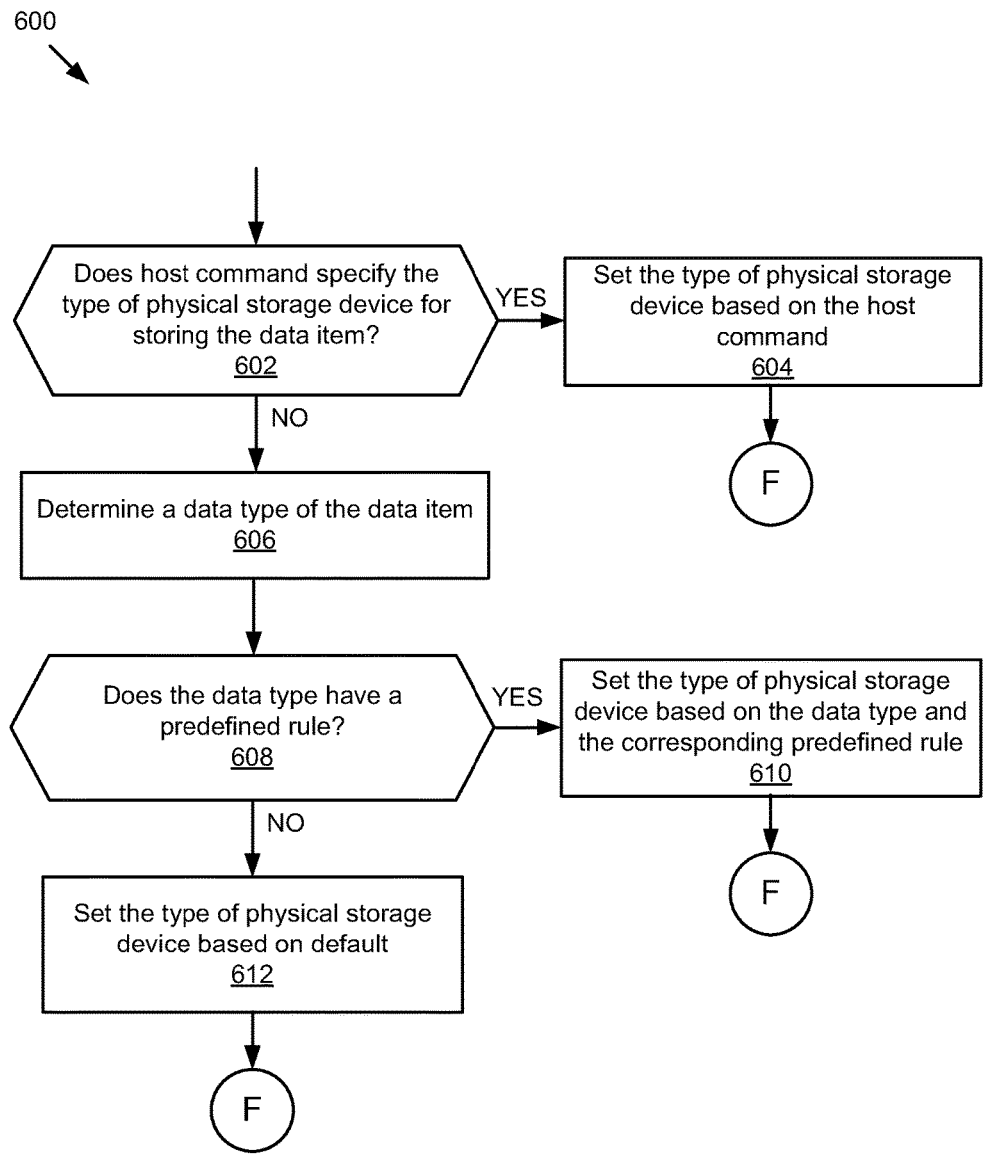
FIGS. 6A and 6B are flowcharts of an example method for selecting a plurality of physical storage devices from a set of physical storage devices associated with a device unit.
Figure 6B:
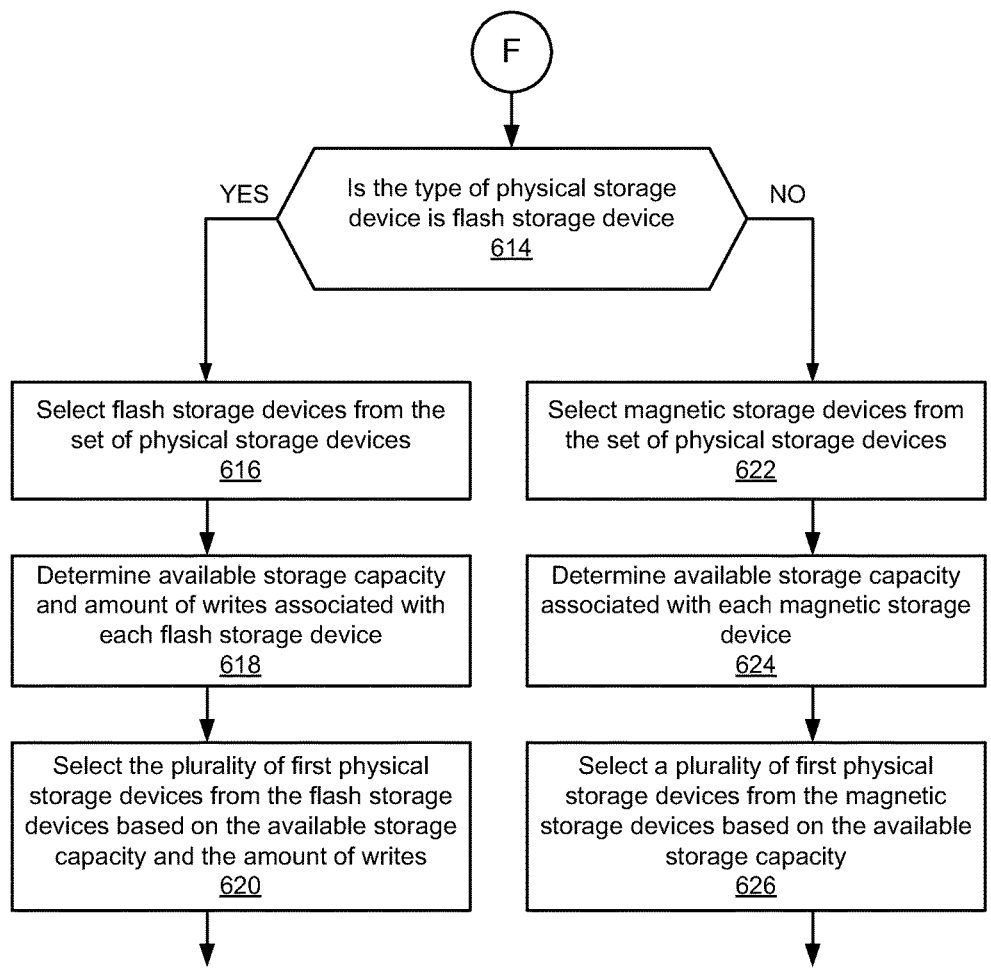

FIGS. 6A and 6B describe flowcharts of an example method 600 for selecting a plurality of first physical storage devices from a set of physical storage devices of a device unit, e.g., for processing a host command including a write operation of a data item. In block 602, the device selecting module 306 may determine whether the host command specifies the type of physical storage device for storing the data item. If the host command specifies the type of physical storage device, the method proceeds to block 604. In block 604, the device selecting module 306 may set the type of physical storage device based on the host command. If the host command does not specify the type of physical storage device, the method proceeds to block 606. In block 606, the device selecting module 306 may determine a data type of the data item. In block 608, the device selecting module 306 may determine whether the determined data type has a predefined rule. If the data type has a predefined rule, the method proceeds to block 610. In block 610, the device selecting module 306 may set the type of physical storage device based on the data type and the corresponding predefine rule. For example, the device selecting module 306 may classify the data item as data item of data mining applications. The device selecting module 306 may determine that there is a predefined rule for data items from data mining applications, which specifies that such data items are stored on HDD. As a result, the device selecting module 306 may set the type of physical storage devices for the data item as HDD according to its data type and the predefined rule corresponding to that data type. If the data type does not have a predefined rule (e.g., a predefined rule corresponding to that data type is not identified), the method proceeds to block 612. In block 612, the device selecting module 306 may set the type of physical storage device based on default. The default setting for the type of physical storage device may SSD or HDD.

The method 600 may proceed with the device selecting module 306 selecting the plurality of first physical storage devices from the set of physical storage devices in the device unit for processing the host command. In block 614, the device selecting module 306 may determine whether the type of physical storage device determined in block 604, block 610, or block 612 is a flash storage device (e.g., SSD). If the determined type of physical storage device is SSD, the method 600 proceeds to block 616. Otherwise, the method 600 proceeds to block 622. In block 616, the device selecting module 306 may select all SSDs from the set of physical storage devices of the device unit as candidate physical storage devices. In block 618, the device selecting module 306 may determine the available storage capacity and the amount of writes associated with each candidate SSD. In block 620, the device selecting module 306 may select the plurality of first physical storage devise from the candidate SSDs based on the available storage capacity and the amount of writes. For example, the device selecting module 306 may select the SSDs that have the ratio between the available storage capacity and the amount of writes satisfies a threshold value. It should be recognized that the device selecting module 306 may use other types of resources associated with the SSDs to select the plurality of first physical storage devices.

If the determined type of physical storage device is not SSD, the method 600 proceeds to block 622. In block 622, the device selecting module 306 may select all HDDs from the set of physical storage devices in the device unit as candidate physical storage devices. In block 624, the device selecting module 306 may determine the available storage capacity associated with each candidate HDD. In block 626, the device selecting module 306 may select the plurality of first physical storage devise from the candidate HDDs based on their available storage capacity. For example, the device selecting module 306 may select the HDDs that have the available storage capacity satisfies a threshold capacity. It should be recognized that the device selecting module 306 may use other types of resources associated with the HDDs to select the plurality of first physical storage devices.

Figure 7A:
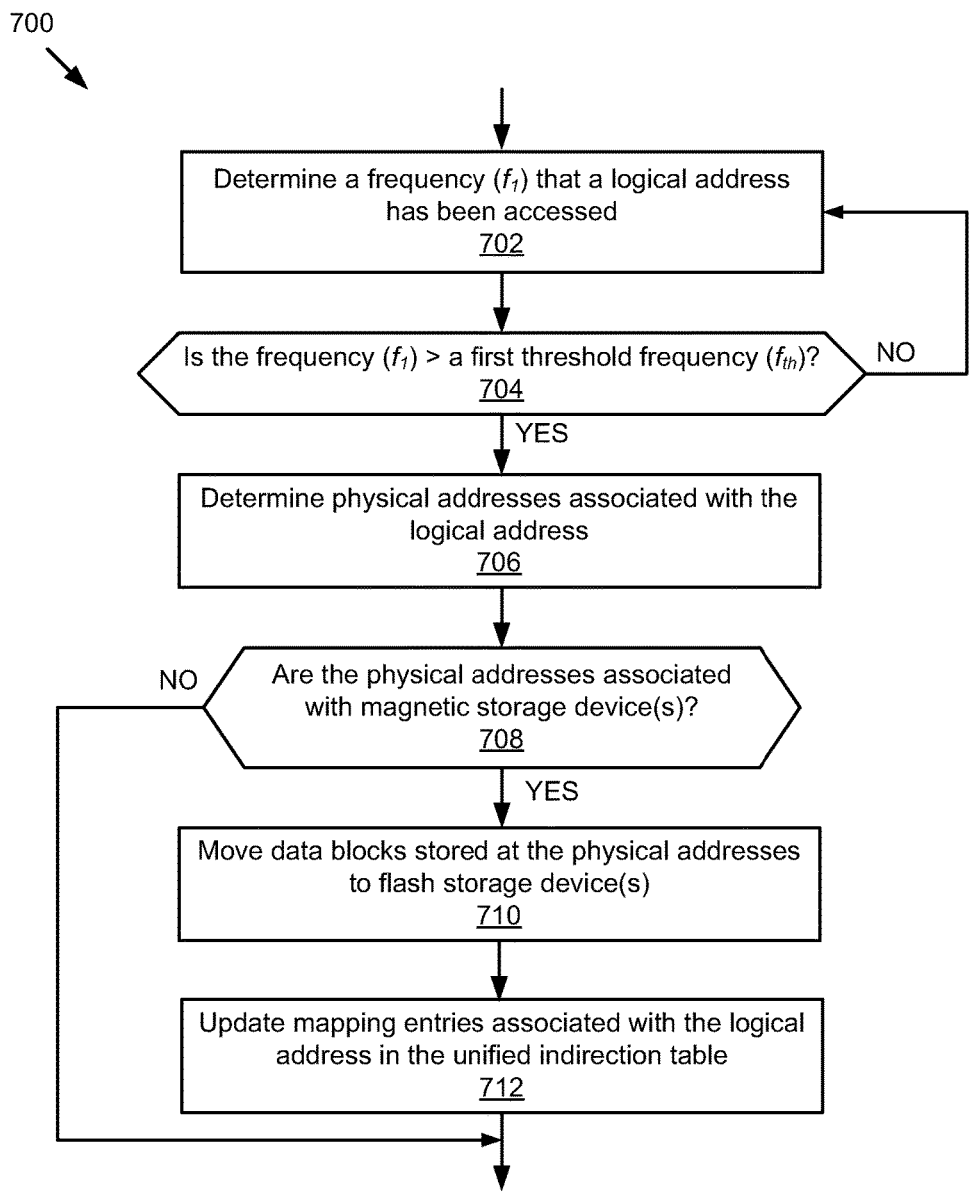
FIGS. 7A and 7B are flowcharts of example methods for relocating a data item among physical storage devices of a device unit.

FIG. 7A is a flowchart of an example method 700 for relocating a data item among the physical storage devices of the device unit, e.g., from the magnetic storage devices to the flash storage devices. In block 702, the host command manager 304 may determine a frequency $f_1$ at which a logical address associated with the device unit has been accessed by the host device. For example, the host command manager 304 may determine the number of times the logical address was included in the host commands that the device unit received during a window of time. In block 704, the optimizing module 314 may determine whether the frequency $f_1$ satisfies a first threshold frequency. For example, the optimizing module 314 may determine whether the frequency $f_1$ is higher than the first threshold frequency $f_{th}$ (e.g., $f_{threshold\_high}$). If the frequency $f_1$ is not higher than the first threshold frequency $f_{th}$, the method 700 returns to block 702 where the host command manager 304 may continue to monitor the frequency of access $f_1$ associated with the logical address. If the frequency $f_1$ is higher than the first threshold frequency $f_{th}$, the method 700 proceeds to block 706.

In block 706, the optimizing module 314 may determine the physical addresses associated with the logical address. For example, the optimizing module 314 may request and receive the mapping entries in the unified indirection table of the device unit that include the logical address. The optimizing module 314 may then analyze the mapping entries to determine the physical addresses associated with the logical address. In block 708, the optimizing module 314 may determine whether the physical addresses are associated with magnetic storage devices (HDDs), e.g., based on a pattern of the physical addresses. If the physical addresses are not associated with HDDs, the optimizing module 314 may not perform any operation. If the physical addresses are associated with HDDs, the method 700 proceeds to block 710. In block 710, the optimizing module 314 may move data blocks stored at the physical addresses on the HDDs (e.g., the source HDDs) to the SSDs of the device unit. For example, the optimizing module 314 may select destination SSDs for these data blocks based on the available resources of the SSDs. The optimizing module 314 may then perform read operations to read the data blocks at the physical addresses on the source HDDs, perform write operations to write these data blocks to the destination SSDs, and perform delete operations to delete the data blocks from the source HDDs. In block 712, the unified indirection module 310 may update the mapping entries associated with the logical address in the unified indirection table of the device unit to replace the physical addresses of the data blocks on the source HDDs with the new physical addresses of the data blocks on the destination SSDs.

Figure 7B:
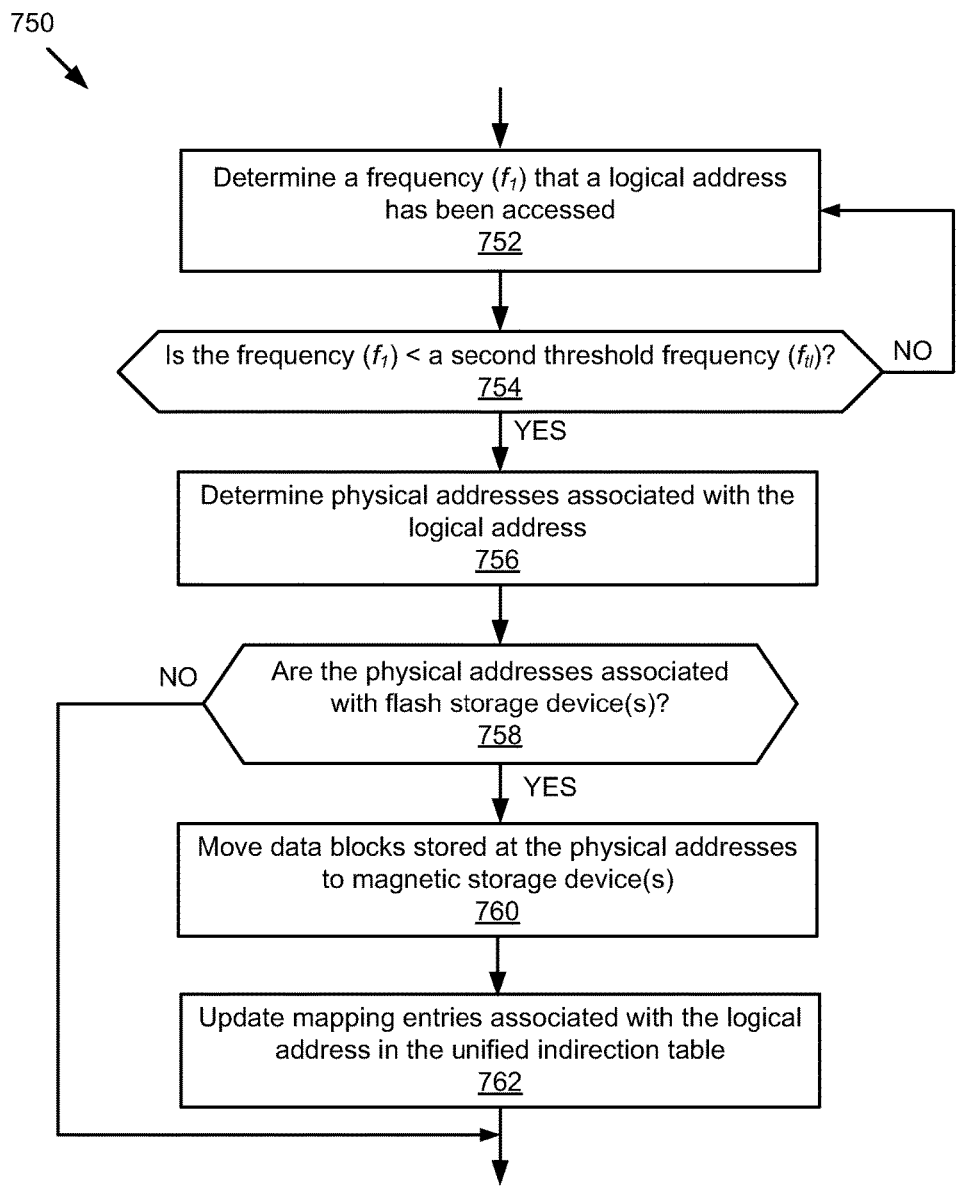

FIG. 7B is a flowchart of an example method 750 for relocating a data item among the physical storage devices of the device unit, e.g., from the flash storage devices to the magnetic storage devices. In block 752, the host command manager 304 may determine a frequency $f_1$ at which a logical address associated with the device unit has been accessed by the host device. For example, the host command manager 304 may determine the number of times the logical address was included in the host commands that the device unit received during a window of time. In block 754, the optimizing module 314 may determine whether the frequency $f_1$ satisfies a second threshold frequency. For example, the optimizing module 314 may determine whether the frequency $f_1$ is below the second threshold frequency $f_{tl}$ (e.g., $f_{threshold\_low}$). If the frequency $f_1$ is not below the second threshold frequency $f_{tl}$, the method 750 returns to block 752 where the host command manager 304 may continue to monitor the frequency of access $f_1$ associated with the logical address. If the frequency $f_1$ is below the second threshold frequency $f_{tl}$, the method 700 proceeds to block 756.

In block 756, the optimizing module 314 may determine the physical addresses associated with the logical address. For example, the optimizing module 314 may request and receive the mapping entries in the unified indirection table of the device unit that include the logical address. The optimizing module 314 may then analyze the mapping entries to determine the physical addresses associated with the logical address. In block 758, the optimizing module 314 may determine whether the physical addresses are associated with flash storage devices (SSDs), e.g., using the list of physical storage devices of the device unit. If the physical addresses are not associated with SSDs, the optimizing module 314 may not perform any operation. If the physical addresses are associated with SSDs, the method 700 proceeds to block 760. In block 760, the optimizing module 314 may move data blocks stored at the physical addresses on the SSDs (e.g., the source SSDs) to the HDDs of the device unit. For example, the optimizing module 314 may select destination HDDs for these data blocks based on the available resources of the HDDs. The optimizing module 314 may then perform read operations to read the data blocks at the physical addresses on the source SSDs, perform write operations to write these data blocks to the destination HDDs, and perform delete operations to delete the data blocks from the source SSDs. In block 762, the unified indirection module 310 may update the mapping entries associated with the logical address in the unified indirection table of the device unit to replace the physical addresses of the data blocks on the source SSDs with the new physical addresses of the data blocks on the destination HDDs.

Systems and methods for implementing a multi-device platform are described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one embodiment" or "an embodiment" means that a particular feature, structure, or characteristic described in connection with the implementation is included in at least one implementation of the disclosed technologies. The appearances of the phrase "in one embodiment" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of a hardware implementation, a software implementation, or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories, which provide temporary storage of at least some program code in order to reduce the number of times code, can be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
   receiving a host command including a logical address;
   determining a hybrid storage device unit based on the logical address, wherein the hybrid storage device unit comprises:
      a set of hybrid physical storage devices, wherein the set of hybrid physical storage devices includes:
         one or more magnetic storage devices; and
         one or more flash storage devices;
      a unified indirection table for the set of hybrid physical storage devices, wherein the unified indirection table includes a plurality of mapping entries mapping logical addresses to physical addresses for all host data stored on the set of hybrid physical storage devices;
      a unified host command queue for the set of hybrid physical storage devices, wherein the unified host command queue manages a priority for host commands for host data stored on the set of hybrid physical storage devices; and
      a set of predefined rules for using the unified indirection table and the unified host command queue to determine host command processing and corresponding physical addresses;
   selecting, based on the priority and from the unified host command queue, the host command for processing;
   selecting, using the unified indirection table and the set of predefined rules to process the host command, a first plurality of physical storage devices from the set of hybrid physical storage devices;
   generating, based on the host command and physical addresses for the first plurality of physical storage devices from the unified indirection table, a plurality of device commands for the first plurality of physical storage devices; and
   executing the plurality of device commands on the first plurality of physical storage devices.

2. The method of claim 1, wherein selecting the first plurality of physical storage devices includes:
   determining a type of physical storage device for executing the host command from a magnetic storage device type and a flash storage device type; and
   responsive to the determined type of physical storage device being the magnetic storage device type:
      identifying one or more first magnetic storage devices included in the set of hybrid physical storage devices;
      determining an available storage capacity for each of the one or more first magnetic storage devices; and
      selecting one or more second magnetic storage devices from the one or more first magnetic storage devices based on the available storage capacity of each of the one or more first magnetic storage devices.

3. The method of claim 1, wherein selecting the first plurality of physical storage devices includes:
   determining a type of physical storage device for executing the host command from a magnetic storage device type and a flash storage device type; and
   responsive to the determined type of physical storage device being the flash storage device type:
      identifying one or more first flash storage devices included in the set of hybrid physical storage devices;
      determining an amount of writes and an available storage capacity for each of the one or more first flash storage devices; and
      selecting one or more second flash storage devices from the one or more first flash storage devices based on the amount of writes and the available storage capacity of each of the one or more first flash storage devices.

4. The method of claim 1, wherein the host command is associated with a data item, and the method further comprises:
   determining a data type of the data item;
   identifying, from the set of predefined rules, a predefined rule associated with the data type; and
   determining a type of physical storage device for the data item based on the data type and the predefined rule.

5. The method of claim 1, wherein the host command is associated with a data item and specifies a device type for the data item, and the method further comprises:
   determining a type of physical storage device for the data item to be the device type specified in the host command.

6. The method of claim 1, wherein the host command includes a write operation of a data item, and generating the plurality of device commands includes:
   partitioning the data item into a plurality of data blocks based on the first plurality of physical storage devices; and
   generating a plurality of device write commands for writing the plurality of data blocks to the first plurality of physical storage devices.

7. The method of claim 1, further comprising:
   determining a frequency at which the logical address has been accessed;
   determining that the frequency satisfies a threshold frequency;
   determining that a data block associated with the logical address is stored in a magnetic storage device included in the set of hybrid physical storage devices; and
   relocating the data block to a flash storage device included in the set of hybrid physical storage devices.

8. The method of claim 1, further comprising:
   determining a frequency at which the logical address has been accessed;
   determining that the frequency satisfies a threshold frequency;
   determining that a data block associated with the logical address is stored in a flash storage device included in the set of hybrid physical storage devices; and
   relocating the data block to a magnetic storage device included in the set of hybrid physical storage devices.

9. The method of claim 1, wherein the unified indirection table is stored in a flash storage device included in the set of hybrid physical storage devices.

10. The method of claim 1, wherein the unified indirection table is stored in at least one of the one or more flash storage devices in the set of hybrid physical storage devices.

11. A system comprising:
   one or more non-transitory hybrid storage device units, wherein each of the hybrid storage device units comprises:
      a set of hybrid physical storage devices, wherein the set of hybrid physical storage devices includes:
         one or more magnetic storage devices; and
         one or more flash storage devices;
      a unified indirection table for the set of hybrid physical storage devices, wherein the unified indirection table is configured to include a plurality of mapping entries mapping logical addresses to physical addresses for all host data stored on the set of hybrid physical storage devices;
      a unified host command queue for the set of hybrid physical storage devices, wherein the unified host command queue is configured to manage a priority for host commands for host data stored on the set of hybrid physical storage devices; and
      a set of predefined rules for using the unified indirection table and the unified host command queue to determine host command processing and corresponding physical addresses; and
   a storage processor coupled to the one or more non-transitory hybrid storage device units and storing a multi-device platform firmware, the multi-device platform firmware executable by the storage processor to:
      receive a host command including a logical address;
      determine a first hybrid storage device unit from the one or more hybrid storage device units based on the logical address;
      select, based on the priority and from the unified host command queue, the host command for processing;
      select, using the unified indirection table and the set of predefined rules to process the host command, a first plurality of physical storage devices from the set of hybrid physical storage devices of the first hybrid storage device unit;
      generate, based on the host command and physical addresses for the first plurality of physical storage devices from the unified indirection table, a plurality of device commands for the first plurality of physical storage devices; and
      execute the plurality of device commands on the first plurality of physical storage devices.

12. The system of claim 11, wherein to select the first plurality of physical storage devices, the multi-device platform firmware, when executed, further causes the system to:
   determine a type of physical storage device for executing the host command from a magnetic storage device type and a flash storage device type;
   responsive to the determined type of physical storage device being the magnetic storage device type, identify one or more first magnetic storage devices included in the set of hybrid physical storage devices;
   determine an available storage capacity for each of the one or more first magnetic storage devices; and
   select one or more second magnetic storage devices from the one or more first magnetic storage devices based on the available storage capacity of each of the one or more first magnetic storage devices.

13. The system of claim 11, wherein to select the first plurality of physical storage devices, the multi-device platform firmware, when executed, further causes the system to:

determine a type of physical storage device for executing the host command from a magnetic storage device type and a flash storage device type;

responsive to the determined type of physical storage device being the flash storage device type, identify one or more first flash storage devices included in the set of hybrid physical storage devices;

determine an amount of writes and an available storage capacity for each of the one or more first flash storage devices; and select one or more second flash storage devices from the one or more first flash storage devices based on the amount of writes and the available storage capacity of each of the one or more first flash storage devices.

14. The system of claim 11, wherein the host command is associated with a data item, and wherein the multi-device platform firmware, when executed, further causes the system to:

determine a data type of the data item;

identify, from the set of predefined rules, a predefined rule associated with the data type; and determine a type of physical storage device for the data item based on the data type and the predefined rule.

15. The system of claim 11, wherein the host command is associated with a data item and specifies a device type for the data item, and wherein the multi-device platform firmware, when executed, further causes the system to:

determine a type of physical storage device for the data item to be the device type specified in the host command.

16. The system of claim 11, wherein the host command includes a write operation of a data item, and wherein to generate the plurality of device commands, the multi-device platform firmware, when executed, further causes the system to:

partition the data item into a plurality of data blocks based on the first plurality of physical storage devices; and generate a plurality of device write commands for writing the plurality of data blocks to the first plurality of physical storage devices.

17. The system of claim 11, wherein the multi-device platform firmware, when executed, further causes the system to:

determine a frequency at which the logical address has been accessed;

determine that the frequency satisfies a threshold frequency;

determine that a data block associated with the logical address is stored in a magnetic storage device included in the set of hybrid physical storage devices; and relocate the data block to a flash storage device included in the set of hybrid physical storage devices.

18. The system of claim 11, wherein the multi-device platform firmware, when executed, further causes the system to:

determine a frequency at which the logical address has been accessed;

determine that the frequency satisfies a threshold frequency;

determine that a data block associated with the logical address is stored in a flash storage device included in the set of hybrid physical storage devices; and relocate the data block to a magnetic storage device included in the set of hybrid physical storage devices.

19. The system of claim 11, wherein the unified indirection table is stored in at least one of the one or more flash storage devices in the set of hybrid physical storage devices.

20. A data storage system, comprising:

means for receiving a host command including a logical address;

means for determining a hybrid storage device unit based on the logical address, wherein the hybrid storage device unit comprises:

a set of hybrid physical storage devices, wherein the set of hybrid physical storage devices includes:

one or more magnetic storage devices; and one or more flash storage devices;

a unified indirection table for the set of hybrid physical storage devices, wherein the unified indirection table is configured to include a plurality of mapping entries mapping logical addresses to physical addresses for all host data stored on the set of hybrid physical storage devices;

a unified host command queue for the set of hybrid physical storage devices, wherein the unified host command queue is configured to manage a priority for host commands for host data stored on the set of hybrid physical storage devices; and a set of predefined rules for using the unified indirection table and the unified host command queue to determine host command processing and corresponding physical addresses;

means for selecting, based on the priority and from the unified host command queue, the host command for processing;

means for selecting, using the unified indirection table and the set of predefined rules to process the host command, a first plurality of physical storage devices from the set of hybrid physical storage devices;

means for generating, based on the host command and physical addresses for the first plurality of physical storage devices from the unified indirection table, a plurality of device commands for the first plurality of physical storage devices; and means for executing the plurality of device commands on the first plurality of physical storage devices.

* * * * *